(12) United States Patent
Hori

(10) Patent No.: US 7,197,532 B2
(45) Date of Patent: Mar. 27, 2007

(54) ELECTRONIC LEAFLET DISTRIBUTION/BROWSING METHOD AND ELECTRONIC LEAFLET SYSTEM

(75) Inventor: Noriyuki Hori, Tokyo (JP)

(73) Assignee: NEC Corporation, Tokyo (JP)

( * ) Notice: Subject to any disclaimer, the term of this patent is extended or adjusted under 35 U.S.C. 154(b) by 759 days.

(21) Appl. No.: 09/911,718

(22) Filed: Jul. 25, 2001

(65) Prior Publication Data

US 2002/0013816 A1 Jan. 31, 2002

(30) Foreign Application Priority Data

Jul. 27, 2000 (JP) .............................. 2000-227833

(51) Int. Cl.
*G06F 15/16* (2006.01)
(52) U.S. Cl. ..................................... 709/203
(58) Field of Classification Search ................ 709/203; 434/365; 705/14, 27
See application file for complete search history.

(56) References Cited

U.S. PATENT DOCUMENTS

| 5,659,742 | A | * | 8/1997 | Beattie et al. ........... 707/104.1 |
| 5,727,156 | A | * | 3/1998 | Herr-Hoyman et al. ..... 709/219 |
| 5,819,092 | A | * | 10/1998 | Ferguson et al. ............ 717/113 |
| 5,820,386 | A | * | 10/1998 | Sheppard, II ................ 434/322 |
| 6,347,333 | B2 | * | 2/2002 | Eisendrath et al. .......... 709/217 |
| 6,347,943 | B1 | * | 2/2002 | Fields et al. ................. 434/118 |
| 6,473,749 | B1 | * | 10/2002 | Smith et al. ..................... 707/2 |
| 6,507,726 | B1 | * | 1/2003 | Atkinson et al. ............ 434/350 |

FOREIGN PATENT DOCUMENTS

| JP | 8-30187 A | 2/1996 |
| JP | 10-214130 A | 8/1998 |
| JP | 11-175627 A | 7/1999 |
| JP | 2000-29961 A | 1/2000 |
| JP | 2000-194757 A | 7/2000 |

OTHER PUBLICATIONS

"Collegeview.com Free College Search Service." Jan. 16th, 1997. Archived copy provided by the WaybackMachine Internet Archive (www.archive.org.) http://web.archive.org/web/19970116182733/http://www.collegeview.com/.*
5. Takashi Nagai, Qualifications for the Digital Age, No. 19, Nikkei PC 21, Japan, Nikkei Business Press, Dec. 1, 1999, vol. 4, No. 12, pp. 246-249.

* cited by examiner

*Primary Examiner*—Rupal Dharia
*Assistant Examiner*—Nicholas R. Taylor
(74) *Attorney, Agent, or Firm*—Sughrue Mion, PLLC

(57) ABSTRACT

The electronic leaflet system includes an electronic leaflet generation unit for making contents data related to leaflets of chairs and lecture meetings into electronic information to generate and output an electronic leaflet, a selection supporting unit for selecting at least one electronic leaflet optimum for various conditions presented by the side of one who wants sending of a leaflet and presenting the selected electronic leaflet to a client terminal on the side of the one who wants sending of a leaflet through an internet, and an electronic leaflet browsing supporting unit for automatically reproducing contents of the selected electronic leaflet in question to promote understanding.

35 Claims, 7 Drawing Sheets

ELECTRONIC LEAFLET DISTRIBUTION/BROWSING METHOD AND ELECTRONIC LEAFLET SYSTEM

BACKGROUND OF THE INVENTION

1. Field of the Invention

The present invention relates to a technique for interactive distribution of leaflets using the Internet and, more particularly, to an electronic leaflet distribution/browsing method and an electronic leaflet system which enable one who wants a leaflet to be sent to sequentially browse leaflets of attending-school or correspondence-class chairs and lecture meetings held by such educational organizations as universities, preparatory schools and private schools on a PC of the one who wants leaflets to be sent through the Internet in descending order of suitability for his or her ability, budget, schedule, etc., thereby enabling the leaflet (electronic leaflet) most suitable for the one who wants sending of leaflets to be obtained in much shorter time, with much less labor and much less costs and to much higher search precision by making the most of interactivity characteristic of the Internet and web browser (browsing software) than by a conventional process of watching and selecting printed leaflets using paper media.

2. Description of the Related Art

When one wants to attend an attending-school or correspondence-class chair (curriculum) or lecture meeting held by such an educational organization as a university, a preparatory school and a private school, it is a common practice to pick out and select an appropriate one of educational organizations such as universities, preparatory schools and private schools listed on a directory (town page) and then make a leaflet (print) be sent from the selected educational organization in question such as a university, a preparatory school or a private school on which leaflet the description about a desired chair (curriculum) or lecture meeting (more specifically, the contents of chair (curriculum), term, lecturer in charge, place, fee, the degree of difficulty, etc.) is listed.

From a point of view of educational organizations such as universities, preparatory schools and private schools, such a process of printing leaflets (prints) on paper to bind a book and sending the bound leaflets to those who want them by door-to-door delivery service or by mail needs to be reduced in terms of costs and labor required.

On the other hand, from a point of view of those who want leaflets to be sent, such work of calling an educational organization from which a leaflet needs to be sent and asking for sending of a leaflet by word of mouth (through telephone), or sending facsimile or a post card to an educational organization from which a leaflet needs to be sent and asking for sending of a leaflet by writing is a great burden on time, cost and labor necessary for asking for sending. In particular, for those who want leaflets to be sent, it is a great burden to find a plurality of educational organizations and individually ask them for sending.

In other words, those who want leaflets to be sent look through various kinds of paper media (prints) to search for necessary education. In addition, since many of educational programs require students to go to places where they are held, constraints on time exist.

As one way of solving such problems, techniques for delivering leaflets through the Internet have become increasingly popular in recent years.

One who is looking for a leaflet first accesses a portal site registered on the Internet through web browser (browsing software) running on a PC (Personal Computer) connected to the Internet to search for a web site which provides desired educational service.

At this time, since enormous volume of search results (i.e. indexes of enormous number of educational organizations as candidates) are ordinarily displayed, one who wants a leaflet to be sent again makes a search by trying with appropriate keywords by himself or herself to narrow down the number of search candidates. Subsequently, he or she moves to a web site presented by the educational organization in question searched by narrowing down the number to designate various kinds of selection items set using an icon (pictorial symbol) or the like in the web site in question, thereby reading (obtaining) a desired leaflet. At this time, he or she downloads the data of the read leaflet in question (read of information) to have hard-copy of the data by using a printer or the like or preserve the same as electronic data in his or her own PC.

However, contents of a desired leaflet that can be read (obtained) by moving to a web site presented by narrowed-down educational organization for search and designating various kinds of selection items set using an icon (pictorial symbol) in the web site in question are of the same level in many cases as those of printed leaflets and a process of selecting attending-school or correspondence-class chairs (curricula) or lecture meetings held by such educational organizations as universities, preparatory schools and private schools which is executed by one who wants a leaflet to be sent is not at all different from that of obtaining printed leaflets.

Under these circumstances, the work by one who wants sending of a leaflet to sequentially select a leaflet most suitable for his or her own ability, budget, schedule, etc. among attending-school or correspondence-class chairs and lecture meetings held by such educational organizations as universities, preparatory schools and private schools on his or her own PC is done through ask-oneself and answer-oneself procedures while watching leaflets on the PC one-sidedly without making so many questions to a party to which a request for a leaflet is made. As a result, even with the Internet or web browser (browsing software), the selection process is not so different from a conventional process of selecting printed leaflets using paper media while watching them and fails to make the most of interactivity characteristic of the Internet and web browser (browsing software).

SUMMARY OF THE INVENTION

The present invention is made in view of the above-described problems and is intended to provide an electronic leaflet distribution/browsing method and an electronic leaflet system which enable one who wants a leaflet to be sent to sequentially read leaflets of attending-school or correspondence-class chairs and lecture meetings held by such educational organizations as universities, preparatory schools and private schools on a PC of the one who wants sending of leaflets through the Internet in descending order of suitability for his or her ability, budget, schedule, etc., thereby enabling the leaflet (electronic leaflet) most suitable for the one who wants sending of leaflets to be obtained in much shorter time, with much less labor and much less costs and to much higher search precision by making the most of interactivity characteristic of the Internet and web browser (browsing software) than by a conventional process of watching and selecting printed leaflets using paper media.

A second object of the present invention is to provide an electronic leaflet distribution/browsing method and an electronic leaflet system which more drastically improve the degree of understanding of the contents prepared in a leaflet (electronic leaflet) selected by one who wants a leaflet to be sent as the most appropriate leaflet (electronic leaflet) than by a conventional process of watching and selecting printed leaflets using paper media.

A third object of the present invention is to provide an electronic leaflet distribution/browsing method and an electronic leaflet system which enable reliable execution of processing of charging one who wants a leaflet to be sent and who is allowed to access fee-charging services according to the contents of the service by checking right to access of the one who wants a leaflet to be sent at the time of access to a web site and when the one in question has right to access, allowing the one in question to access the system.

A fourth object of the present invention is to provide an electronic leaflet distribution/browsing method and an electronic leaflet system which enable automatic reproduction, in the form of movie, of a leaflet (electronic leaflet) most suitable for ability, budget, schedule, etc., of one who wants a leaflet to be sent among leaflets of attending-school or correspondence-class chairs and lecture meetings held by such educational organizations as universities, preparatory schools and private schools on a PC of the one in question (client terminal on the side of the one who wants leaflets to be sent) through the Internet in descending order of suitability by automatically reproducing contents contained in a sub-menu prepared in advance in a selected electronic leaflet in question on a display of the one in question according to a request of the one who wants a leaflet to be sent.

A fifth object of the present invention is to make one who wants a leaflet to be sent have more profound sensible comprehension of contents of school lessons and atmosphere of chairs and lecture meetings prepared in a leaflet (electronic leaflet) selected by the one in question as an appropriate leaflet than by a conventional process of watching and selecting printed leaflets using paper media. In other words, the object is to provide an electronic leaflet distribution/browsing method and an electronic leaflet system which present one who wants a leaflet to be sent virtual reality space that can not be attained by a conventional process of watching and selecting printed leaflets using paper media to more drastically improve the degree of understanding of a leaflet (electronic leaflet) selected by the one who wants the leaflet to be sent than by a conventional process of watching and selecting printed leaflets using paper media.

A sixth object of the present invention is to introduce one who wants a leaflet to be sent a chair or a lecture meeting required most by the one in question by making the most of interactivity characteristic of the Internet and web browser (browsing software). On the other hand, the object is to also provide an electronic leaflet distribution/browsing method and an electronic leaflet system which enable one who wants a leaflet to be sent to objectively recognize his or her own weak point and a subject to be supplemented, as well as enabling him or her to obtain an optimum leaflet (electronic leaflet) introducing a chair and a lecture meeting directed to his or her weak point and a subject to be supplemented in much shorter time, with much less labor and much less costs and to much higher search precision than by a conventional process of watching and selecting printed leaflets using paper media.

A seventh object of the present invention is to provide an electronic leaflet distribution/browsing method and an electronic leaflet system which charge an educational organization according to the volume of data at new registration or updating of contents data of an electronic leaflet conducted at a server and charge the same according to the volume of data at new registration or updating of contents data of an electronic leaflet made in an electronic leaflet data base, thereby realizing reliable execution of processing of charging an educational organization as a user of a server-side web site according to the contents of services.

According to one aspect of the invention, an electronic leaflet distribution/browsing method, comprising the steps of an electronic leaflet generation step of making contents data related to leaflets concerning a plurality of educational organizations into electronic information through designation of various kinds of selection items set in a web site on the side of a server to generate and output an electronic leaflet by the web site of the server, an electronic leaflet data base management step of making the electronic leaflet generated and output into a data base having a predetermined layered structure and preserving the obtained electronic leaflet in an electronic leaflet data base, a selection supporting step of selecting at least one electronic leaflet optimum for various conditions presented by one who wants sending of a leaflet among electronic leaflets and presenting the selected electronic leaflet to a client terminal on the side of the one who wants sending of a leaflet through an internet by the web site of the server, and an electronic leaflet browsing supporting step of, in response to a request of one who wants sending of a leaflet, automatically reproducing the contents contained in a sub-menu prepared in advance in the selected electronic leaflet in question on a display of the client terminal on the side of the one who wants sending of a leaflet in question to promote understanding of the contents prepared in the selected electronic leaflet in question.

In the preferred construction, the electronic leaflet relates to attending-school or correspondence-class chairs and lecture meetings of a plurality of educational organizations such as universities, preparatory schools, professional schools, cultural schools and private schools for elementary/junior-high/high schools.

In another preferred construction, at least one optimum electronic leaflet is selected from among electronic leaflets according to various conditions presented by one who wants sending of a leaflet through designation of various kinds of selection items set in advance related to icons in the web site of the server.

In another preferred construction, the electronic leaflet distribution/browsing method further comprising a user access authentication step of, when the one who wants sending of a leaflet accesses the web site, checking right to access of the one who wants sending of a leaflet in question and when the one who wants sending of a leaflet in question has right to access, informing the web site of the server that access of the client terminal on the side of the one who wants sending of a leaflet in question to the web site of the server is allowed.

In another preferred construction, the selection supporting step further comprises a question step of receiving various conditions presented by one who wants sending of a leaflet and who is allowed to access by the user access authentication step by clicking an icon in the web site to designate each kind of selection items set in advance related to the icon in question, and an electronic leaflet presenting step of searching the electronic leaflet data base based on the received various conditions to select at least one electronic leaflet matched most to the various conditions input by the one who wants sending of a leaflet in question from among electronic leaflets accumulated in the electronic leaflet data base and present, for the one who wants sending of a leaflet in question, the selected electronic leaflet to the client terminal on the side of the one who wants sending of a leaflet through the internet.

In another preferred construction, the selection supporting step further comprises:

a question step of receiving various conditions presented by one who wants sending of a leaflet and who is allowed to access by the user access authentication step by clicking an icon in the web site to designate each kind of selection items set in advance related to the icon in question through the internet, and an electronic leaflet presenting step of searching the electronic leaflet data base based on the various conditions received from the question step to select a predetermined number of electronic leaflets in descending order of suitability for the various conditions input by the one who wants sending of a leaflet in question from among electronic leaflets accumulated in the electronic leaflet data base and present the selected electronic leaflets to the client terminal on the side of the one who wants sending of a leaflet.

In another preferred construction, the electronic leaflet browsing supporting step comprises a movie reproduction step of, when an electronic leaflet in which moving picture data, voice data and/or document data are prepared as contents in advance is selected by one who wants sending of a leaflet, automatically reproducing the moving picture data, voice data and/or document data in question on the display of the client terminal on the side of the one who wants sending of a leaflet in question to promote understanding of the contents prepared in the selected electronic leaflet.

In another preferred construction, the moving picture data, voice data and/or document data include data generated by editing scenes of school lessons recorded in the past in attending-school or correspondence-class chairs and lecture meetings held by educational organizations such as a university, a preparatory school and a private school.

In another preferred construction, the moving picture data, voice data and/or document data include data generated by editing interview scenes recorded in the past of lecturers in charge of attending-school or correspondence-class chairs and lecture meetings held by educational organizations such as a university, a preparatory school and a private school.

In another preferred construction, the moving picture data, voice data and/or document data include data generated by recording and editing interview scenes of students who took attending-school or correspondence-class chairs and lecture meetings held by educational organizations such as a university, a preparatory school and a private school in the past.

In another preferred construction, the moving picture data, voice data and/or document data include data generated by editing teaching materials and transcripts of lectures for attending-school or correspondence-class chairs presented by educational organizations such as a university, a preparatory school and a private school in the past.

In another preferred construction, various kinds of selection items set in advance at the question step include a condition related to at least one of ability and qualification required for taking attending-school or correspondence-class chairs and lecture meetings held by educational organizations such as a university, a preparatory school and a private school, budget, school lesson schedule and qualifying schedule.

In another preferred construction, the question step comprises a mock examination sending step of, when one who wants sending of a leaflet and who is allowed to make an access by the user access authentication step clicks a mock examination icon enabling selection of a mock examination for supporting self-determination of basic scholastic ability and/or aptitude required for taking attending-school or correspondence-class chairs and lecture meetings held by educational organizations such as a university, a preparatory school and a private school, sending question data of the mock examination to the client terminal on the side of the one who wants sending of a leaflet in question through the internet, and a mock examination determination step of receiving answer data from one who wants sending of a leaflet to mark the answer data, generating various conditions including current ability of the one who wants sending of a leaflet, ability required for taking a chair or a lecture meeting, a kind of chair or lecture meeting recommended and a specific name of a chair or a lecture meeting based on the marking result and outputting the conditions to the electronic leaflet browsing supporting step.

In another preferred construction, the electronic leaflet distribution/browsing method further comprising a charging step of charging an educational organization according to the volume of data at new registration or updating of contents data of an electronic leaflet conducted at the electronic leaflet generation step.

In another preferred construction, the charging step charges an educational organization according to the volume of data at new registration or updating of contents data of an electronic leaflet made in the electronic leaflet data base.

In another preferred construction, when one who wants sending of a leaflet accesses the web site of the server side and right to access of the one who wants sending of a leaflet in question is checked, if the one who wants sending of a leaflet has chargeable right to access, the user access authentication step informs the charging step and the selection supporting step that access of the one who wants sending of a leaflet in question to chargeable moving picture data, voice data and/or document data is allowed, the selection supporting step receives, through the question step, various conditions presented by one who wants sending of a leaflet and who is allowed to access by the user access authentication step by clicking an icon in the web site to designate each kind of selection items set in advance related to the icon in question, and searches the electronic leaflet data base based on the various conditions received through the electronic leaflet presenting step to select a chargeable electronic leaflet matched most to the various conditions input by the one who wants sending of a leaflet in question from among chargeable electronic leaflets accumulated in the electronic leaflet data base and present, for the one who wants sending of a leaflet in question, the selected electronic leaflet to the client terminal on the side of the one who wants sending of a leaflet through the internet, and the charging step charges the one who wants sending of a leaflet in question according to conditions of access to a chargeable electronic leaflet.

In another preferred construction, when chargeable the moving picture data, voice data and/or document data are sent to chargeable one who wants sending of a leaflet through the internet, the charging step executes processing of charging the one who wants sending of a leaflet in question.

According to another aspect of the invention, an electronic leaflet system, comprises an electronic leaflet generation unit for making contents data related to leaflets concerning a plurality of educational organizations into electronic information through designation of various kinds of selection items set using icons in a web site on the side of a server to generate and output an electronic leaflet, an electronic leaflet data base for making the electronic leaflet generated and output into a data base having a predetermined layered structure and preserving the obtained electronic leaflet, a selection supporting unit for selecting at least one electronic leaflet optimum for various conditions presented by one who wants sending of a leaflet in question among the electronic leaflets and presenting the selected electronic leaflet to a client terminal on the side of one who wants sending of a leaflet through an internet, and an electronic leaflet browsing supporting unit responsive to a request from one who wants sending of a leaflet for automatically reproducing the contents contained in a submenu prepared in advance in the selected electronic leaflet in question on a display of the client terminal on the side of the one who wants sending of a leaflet in question to promote understanding of the contents prepared in the selected electronic leaflet in question.

In the preferred construction, the electronic leaflet relates to attending-school or correspondence-class chairs and lecture meetings of a plurality of educational organizations such as universities, preparatory schools, professional schools, cultural schools and private schools for elementary/junior-high/high schools.

In another preferred construction, the selection supporting unit selects at least one optimum electronic leaflet from among electronic leaflets according to various conditions presented by one who wants sending of a leaflet through designation of various kinds of selection items set in advance related to icons in the web site of the server.

In another preferred construction, the electronic leaflet system further comprises a user access authentication unit for, when the client terminal of one who wants sending of a leaflet accesses the web site of the server, checking right to access of the one who wants sending of a leaflet in question and when the one who wants sending of a leaflet in question has right to access, informing the system side that access of the one who wants sending of a leaflet in question to the system is allowed.

In another preferred construction, the selection supporting unit further comprises a question unit for receiving various conditions presented by one who wants sending of a leaflet and who is allowed to access by the user access authentication unit by clicking an icon in the web site of the server to designate each kind of selection items set in advance related to the icon in question, and an electronic leaflet presenting unit for searching the electronic leaflet data base based on the received various conditions to select at least one electronic leaflet matched most to the various conditions input by the one who wants sending of a leaflet in question from among electronic leaflets accumulated in the electronic leaflet data base and present the selected electronic leaflet to the client terminal on the side of the one who wants sending of a leaflet in question through the internet.

In another preferred construction, the selection supporting unit further comprises a question unit for receiving various conditions presented by one who wants sending of a leaflet and who is allowed to access by the user access authentication unit by clicking an icon in the web site of the server side to designate each kind of selection items set in advance related to the icon in question through the internet, and an electronic leaflet presenting unit for searching the electronic leaflet data base based on the various conditions received from the question unit to select a predetermined number of electronic leaflets in descending order of suitability for the various conditions input by the one who wants sending of a leaflet in question from among electronic leaflets accumulated in the electronic leaflet data base and present the selected electronic leaflets to the client terminal on the side of the one who wants sending of a leaflet.

In another preferred construction, the electronic leaflet browsing supporting unit includes a movie reproduction unit for, when an electronic leaflet in which moving picture data, voice data and/or document data are prepared as contents in advance is selected by one who wants sending of a leaflet, automatically reproducing the moving picture data, voice data and/or document data in question on the display of the client terminal on the side of the one who wants sending of a leaflet in question to promote understanding of the contents prepared in the selected electronic leaflet.

In another preferred construction, the moving picture data, voice data and/or document data include data generated by editing scenes of school lessons recorded in the past in attending-school or correspondence-class chairs and lecture meetings held by educational organizations such as a university, a preparatory school and a private school.

In another preferred construction, the moving picture data, voice data and/or document data include data generated by editing interview scenes recorded in the past of lecturers in charge of attending-school or correspondence-class chairs and lecture meetings held by educational organizations such as a university, a preparatory school and a private school.

In another preferred construction, the moving picture data, voice data and/or document data include data generated by recording and editing interview scenes of students who in the past took attending-school or correspondence-class chairs and lecture meetings held by educational organizations such as a university, a preparatory school and a private school.

In another preferred construction, the moving picture data, voice data and/or document data include data generated by editing teaching materials and transcripts of lectures for attending-school or correspondence-class chairs presented by educational organizations such as a university, a preparatory school and a private school in the past.

In another preferred construction, various kinds of selection items set in advance in the question unit include a condition related to at least one of ability and qualification required for taking attending-school or correspondence-class chairs and lecture meetings held by educational organizations such as a university, a preparatory school and a private school, budget, school lesson schedule and qualifying schedule.

In another preferred construction, the question unit includes a mock examination icon which enables selection of a mock examination for supporting self-determination of basic scholastic ability and/or aptitude required for taking attending-school or correspondence-class chairs and lecture meetings held by educational organizations such as a university, a preparatory school and a private school, a mock examination sending unit for, when one who wants sending of a leaflet and who is allowed to make an access by the user access authentication unit clicks the mock examination icon in the web site of the server side, sending question data of the mock examination to the client terminal on the side of the one who wants sending of a leaflet in question through the internet, and a mock examination determination unit for receiving answer data from the client terminal on the side of one who wants sending of a leaflet to mark the answer data, generating various conditions including current ability of the one who wants sending of a leaflet in question, ability required for taking a chair or a lecture meeting, a kind of chair or lecture meeting recommended and a specific name of a chair or a lecture meeting based on the marking result and outputting the conditions to the electronic leaflet browsing supporting unit.

In another preferred construction, the electronic leaflet system further comprises a charging unit for charging an educational organization according to the volume of data at new registration or updating of contents data of an electronic leaflet conducted at the electronic leaflet generation unit.

In another preferred construction, the charging unit charges an educational organization according to the volume of data at new registration or updating of contents data of an electronic leaflet made in the electronic leaflet data base.

In another preferred construction, when the client terminal on the side of one who wants sending of a leaflet accesses the web site of the server side and right to access of the one who wants sending of a leaflet in question is checked, if the one who wants sending of a leaflet has chargeable right to access, the user access authentication unit informs the charging unit and the selection supporting unit that access of the one who wants sending of a leaflet in question to chargeable moving picture data, voice data and/or document data is allowed, the selection supporting unit receives, through the question unit, various conditions presented by one who wants sending of a leaflet and who is allowed to access by the user access authentication unit by clicking an icon in the web site of the server to designate each kind of selection items set in advance related to the icon in question, and searches the electronic leaflet data base based on the various conditions received through the electronic leaflet presenting unit to select a chargeable electronic leaflet matched most to the various conditions input by the one who wants sending of a leaflet in question from among chargeable electronic leaflets accumulated in the electronic leaflet data base and present the selected electronic leaflet to the client terminal on the side of the one who wants sending of a leaflet through the internet, and the charging unit charges the one who wants sending of a leaflet in question according to conditions of access to a chargeable electronic leaflet.

In another preferred construction, when chargeable the moving picture data, voice data and/or document data are sent to the client terminal on the side of chargeable one who wants sending of a leaflet through the internet, the charging unit executes processing of charging the one who wants sending of a leaflet in question.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

The present invention is characterized in that one who wants a leaflet to be sent is allowed to sequentially browse leaflets of attending-school or correspondence-class (correspondence class realized by mailing of printed teaching materials, correspondence class in the form of distance learning through the Internet, etc.) chairs and lecture meetings held by such educational organizations as universities, preparatory schools and private schools on a PC of the one who wants leaflets to be sent through the Internet in descending order of suitability for his or her ability, budget, schedule, etc., thereby enabling the leaflet (electronic leaflet) most suitable for the one who wants sending of leaflets to be obtained in much shorter time, with much less labor and much less costs and to much higher search precision by making the most of interactivity characteristic of the Internet and web browser (browsing software) than by a conventional process of watching and selecting printed leaflets using paper media. In the following, an embodiment of the present invention will be described in detail with reference to the drawings.

Figure 1:
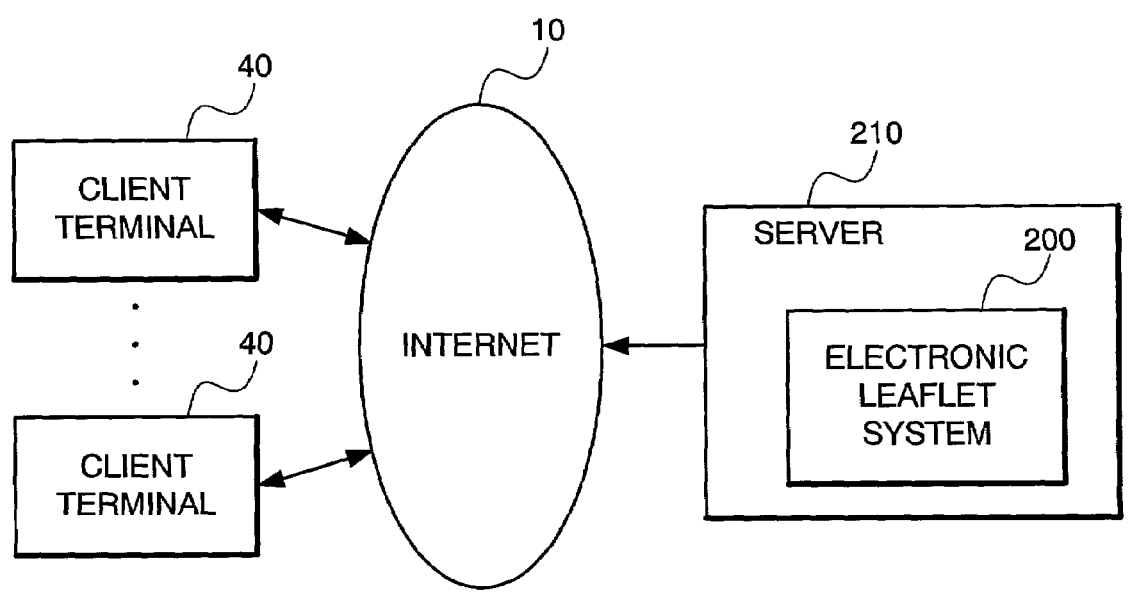
FIG. 1 is a block diagram showing an entire structure of an electronic leaflet system according to one embodiment of the present invention.
Figure 2:
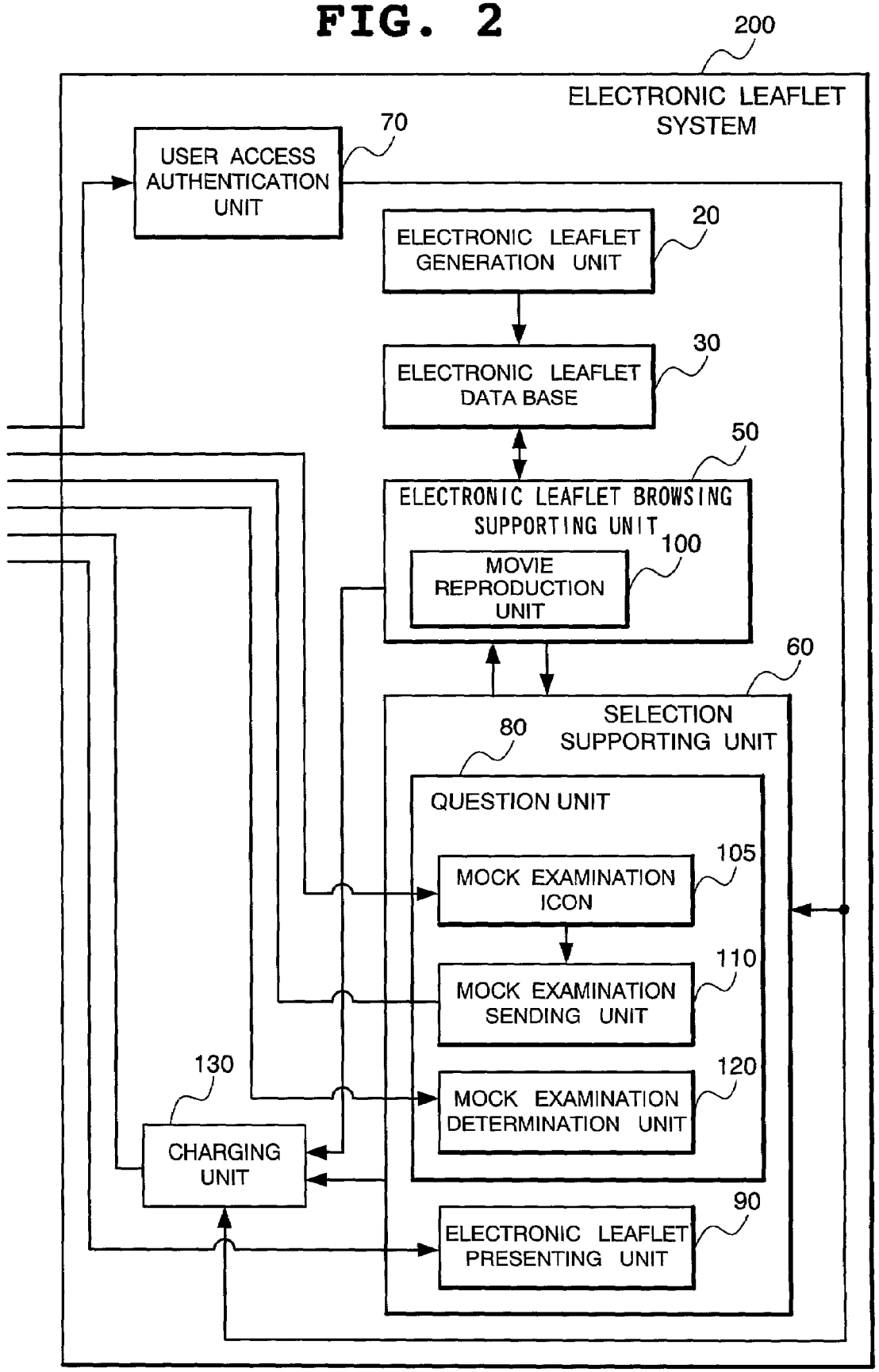
FIG. 2 is a block diagram for use in explaining a detailed structure of the electronic leaflet system according to one embodiment of the present invention.
Figure 3:
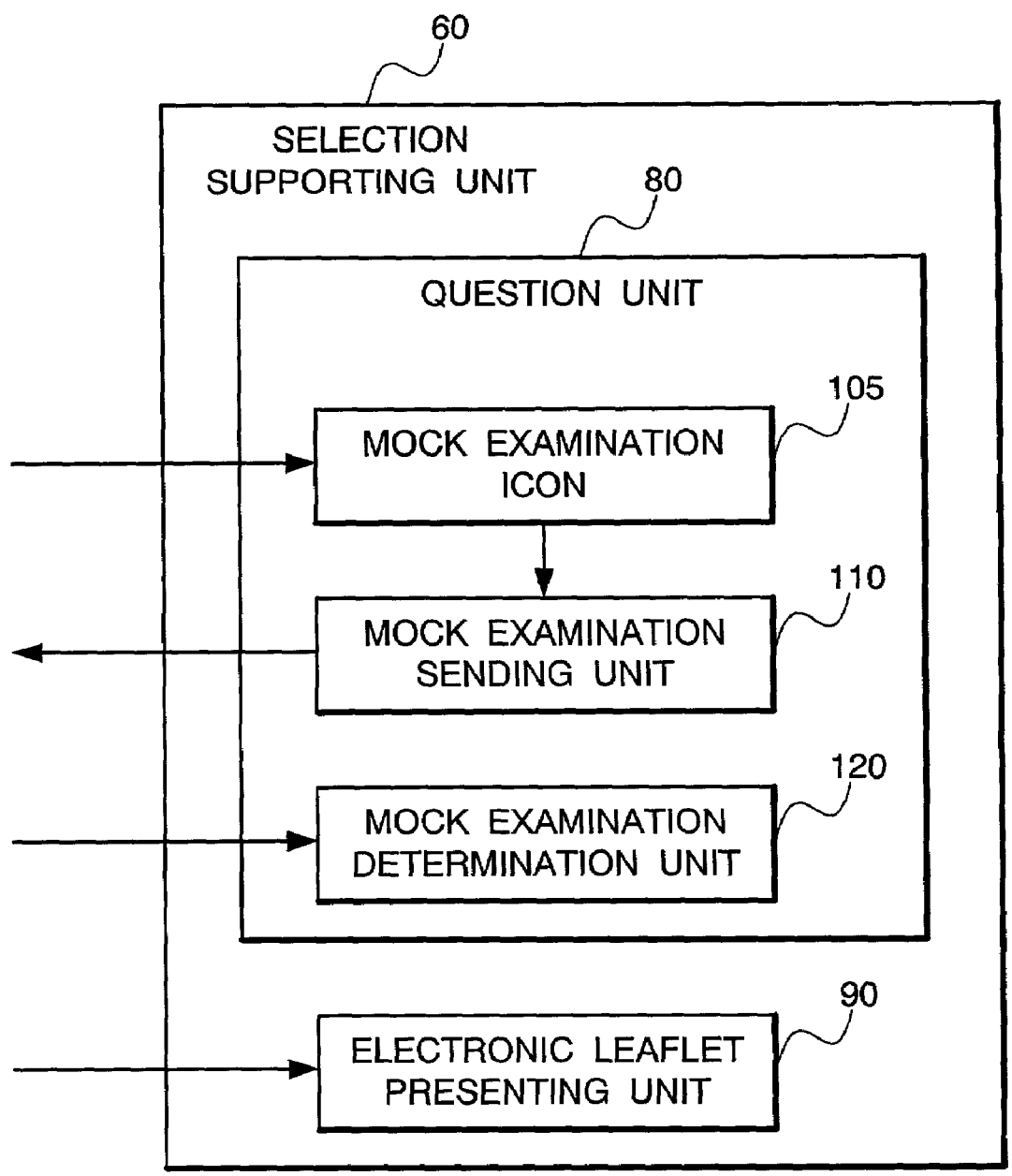
FIG. 3 is a block diagram for use in explaining structure of a selection supporting unit of the electronic leaflet system according to one embodiment of the present invention.
Figure 4:
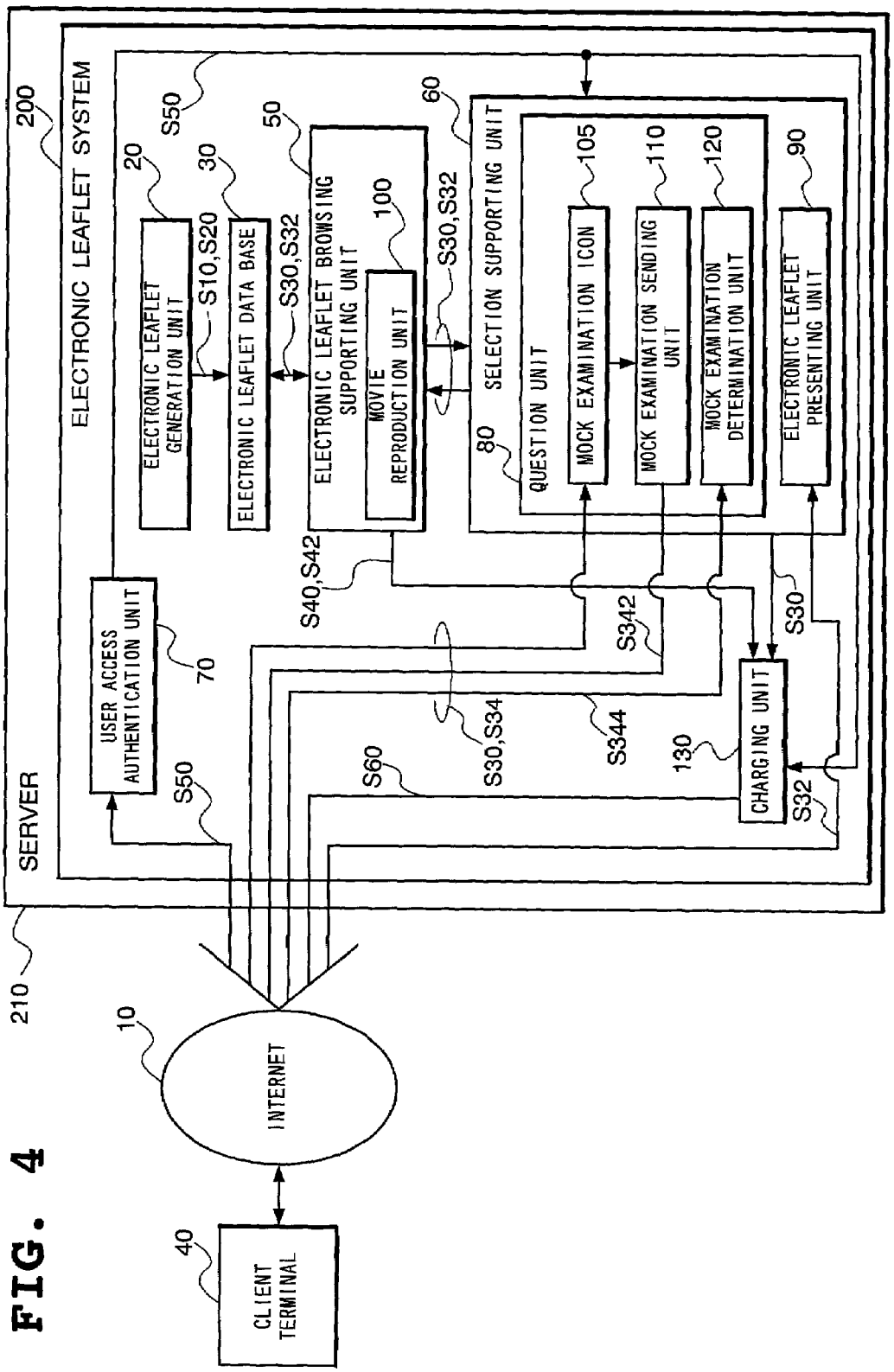
FIG. 4 is a block diagram for use in explaining flow of operation of the electronic leaflet system according to one embodiment of the present invention.

FIG. 1 is a block diagram showing an entire structure of an electronic leaflet system according to one embodiment of the present invention, FIG. 2 is a block diagram for use in explaining a detailed structure of the electronic leaflet system according to one embodiment, FIG. 3 is a block diagram for use in explaining structure of a selection supporting unit of the electronic leaflet system, and FIG. 4 is a diagram for use in explaining flow of the entire processing.

In FIG. 1, the present system is composed of a server 210 and at least one client terminal 40 on the side of one who wants a leaflet to be sent which are connected to each other through an internet 10, in which the server 210 realizes an electronic leaflet system 200.

The electronic leaflet system 200, as shown in FIG. 2, includes an electronic leaflet generation unit 20, an electronic leaflet data base 30, an electronic leaflet browsing supporting unit 50, a selection supporting unit 60 and a user access authentication unit 70.

Then, the electronic leaflet browsing supporting unit 50 includes a movie reproduction unit 100 for reproducing movies.

In addition, the selection supporting unit 60, as shown in FIG. 3, includes a question unit 80 and an electronic leaflet presenting unit 90 and the question unit 80 includes a mock examination icon 105, a mock examination sending unit 110 and a mock examination determination unit 120.

With reference to FIG. 4, the electronic leaflet system 200 of the present embodiment is connectable to the client terminal 40 (PC: personal computer) on the side of one who wants sending of leaflets through the Internet 10, which is set up within a web site on the side of the server 210 connected to the internet 10, and is mainly composed of the electronic leaflet generation unit 20, the electronic leaflet data base 30, the electronic leaflet browsing supporting unit 50, the selection supporting unit 60, the user access authentication unit 70, the question unit 80, the electronic leaflet presenting unit 90, the movie reproduction unit 100, the mock examination sending unit 110, the mock examination determination unit 120 and a charging unit 130.

The electronic leaflet generation unit 20 has a function of making into electronic information the contents data (contents documents and images described with such electronic document description languages as SGML and HTML) related to leaflets (leaflets provided by the side of a provider of teaching materials, which are ordinarily printed leaflets) of attending-school or correspondence-class (correspondence class realized by mailing of printed teaching materials, correspondence class in the form of distance learning through the Internet, etc.) chairs and lecture meetings held by a plurality of educational organizations including universities, preparatory schools, professional schools, various kinds of schools, training schools, cultural schools (e.g. cooking, instrument play, etc.) and private schools for elementary schools, secondary schools and high schools through designation of various kinds of selection items (to be specific, ability and qualification required for taking a chair or a lecture meeting (age, sex, etc.), budget, school lesson schedule, qualifying schedule, etc.) set on a window using icons within the web site on the server 210 accessible to the internet 10, thereby generating and outputting an electronic leaflet. The function is realized by a computer resource (to be specific, a CPU (central processing unit), a memory, a hard disc or the like) and a program managed by the server 210.

The electronic leaflet data base 30 has a function of making an electronic leaflet generated and output by the electronic leaflet generation unit 20 into a data base having a predetermined layered structure (to be specific, data structure in which sub-menus are layered) based on a leaflet (which is ordinarily a printed leaflet) presented by the provider of teaching materials and preserving the electronic leaflet in the data base. The function is realized by a computer resource (to be specific, a CPU, a memory, a hard disc or the like) and a program managed by the server 210.

The selection supporting unit 60 has a function of selecting at least one electronic leaflet optimum for various conditions presented by the side of one who wants a leaflet to be sent (client) among electronic leaflets (leaflet data described with such electronic document description languages as SGML and HTML) and presenting (distribution through the net) the selected leaflet to the client terminal 40 (PC) on the side of the one who wants a leaflet to be sent through the internet 10 according to various conditions presented by the client's designation of various kinds of selection items (to be specific, ability and qualification required for taking a chair or a lecture meeting (age, sex, etc.), budget, school lesson schedule, qualifying schedule, etc.) set in advance related to icons in the web site on the server 210 side. The function is realized by a computer resource (to be specific, a CPU, a memory, a hard disc or the like) and a program managed by the server 210.

The electronic leaflet browsing supporting unit 50 has the movie reproduction unit 100 and a function of, in response to a request of one who wants a leaflet to be sent (client), automatically reproducing (movie reproduction in particular) the content (contents documents and images described with such electronic document description languages as SGML and HTML) contained in a sub-menu (not shown) prepared in advance within a selected electronic leaflet on a display (not shown) of the client terminal 40 (PC) on the side of the one who wants a leaflet to be sent to promote understanding of the contents prepared in the selected electronic leaflet. The function is realized by a computer resource (to be specific, a CPU (central processing unit), a memory, a hard disc or the like) and a program managed by the server 210.

In response to a request of one who wants a leaflet to be sent (client), by thus automatically reproducing (movie reproduction in particular) the contents (contents documents and images described with such electronic document description languages as SGML and HTML) contained in a sub-menu (not shown) prepared in advance within a selected electronic leaflet on a display (not shown) of the one who wants a leaflet to be sent (client), the system produces the effect of automatically reproducing, in the form of movie, a leaflet (electronic leaflet) most suitable for his or her ability, budget, schedule, and the like of the one who wants a leaflet to be sent (client) on an icon displayed on the display (not shown) of the PC of the one who wants sending of a leaflet (client) (client terminal 40 on the side of the one who wants leaflets to be sent) through the Internet 10 in descending order of suitability among attending-school or correspondence-class (correspondence class realized by mailing of printed teaching materials, correspondence class in the form of distance learning through the Internet, etc.) chairs and lecture meetings held by such educational organizations as universities, preparatory schools and private schools.

As a result, the degree of understanding of the contents (contents documents and images described with such electronic document description languages as SGML and HTML) prepared in a leaflet (electronic leaflet) selected as the leaflet (electronic leaflet) most appropriate for one who wants a leaflet to be sent (client) can be more drastically improved than by a conventional process of watching and selecting printed leaflets using paper media.

The movie reproduction unit 100 has a function of automatically reproducing (movie reproduction in particular) moving picture data, voice data and document data on a display (not shown) of the client terminal 40 (PC) on the side of one who wants a leaflet to be sent (client) when an electronic leaflet in which moving picture data, voice data and document data are prepared in advance is selected by the one who wants a leaflet to be sent, thereby promoting understanding of the contents prepared in the selected electronic leaflet. The function is realized by a computer resource (to be specific, a CPU (central processing unit), a memory, a hard disc or the like) and a program managed by the server 210.

In response to a request of one who wants a leaflet to be sent (client), by thus automatically reproducing (movie reproduction in particular) the contents (moving picture data, voice data and document data described with such electronic document description languages as SGML and HTML) contained in a sub-menu (not shown) prepared in advance within a selected electronic leaflet on a display (not shown) of the one who wants a leaflet to be sent (client), the system produces the effect of automatically reproducing, in the form of movie, a leaflet (electronic leaflet) most suitable for his or her ability, budget, schedule and the like of the one who wants a leaflet to be sent (client) among attending-school or correspondence-class (correspondence class realized by mailing of printed teaching materials, correspondence class in the form of distance learning through the Internet, etc.) chairs and lecture meetings held by such educational organizations as universities, preparatory schools and private schools on an icon displayed on the display (not shown) of the PC of the one who wants sending of a leaflet (client terminal 40 on the side of the one who wants leaflets to be sent) through the Internet 10 in descending order of suitability.

As a result, the degree of understanding of the contents (contents documents and images described with such electronic document description languages as SGML and HTML) prepared in a leaflet (electronic leaflet) selected as an optimum leaflet (electronic leaflet) for the one who wants a leaflet to be sent (client) can be more drastically improved than by a conventional process of watching and selecting printed leaflets using paper media.

Moving picture data, voice data and document data of the present embodiment include data generated by editing scenes of school lessens which were recorded in the past (e.g. previous school year) in attending-school or correspondence-class (correspondence class realized by mailing of printed teaching materials, correspondence class in the form of distance learning through the Internet, etc.) chairs and lecture meetings presented by such educational organizations as universities, preparatory schools and private schools.

The moving picture data, voice data and document data also include data generated by editing interview scenes recorded in the past (e.g. previous school year) of lecturers in charge of attending-school or correspondence-class (correspondence class realized by mailing of printed teaching materials, correspondence class in the form of distance learning through the Internet, etc.) chairs and lecture meetings presented by such educational organizations as universities, preparatory schools and private schools.

The moving picture data, voice data and document data also include data generated by recording and editing interview scenes of students who in the past took attending-school or correspondence-class (correspondence class realized by mailing of printed teaching materials, correspondence class in the form of distance learning through the Internet, etc.) chairs and lecture meetings presented by such educational organizations as universities, preparatory schools, and private schools.

The moving picture data, voice data and document data also include data generated by editing teaching materials and transcripts of lectures (or resumes) of attending-school or correspondence-class (correspondence class realized by mailing of printed teaching materials, correspondence class in the form of distance learning through the Internet, etc.) chairs and lecture meetings held in the past by such educational organizations as universities, preparatory schools and private schools.

Thus, the system produces the effect of automatically reproducing as moving picture data, voice data and document data of a leaflet (electronic leaflet data) selected as a leaflet (electronic leaflet) optimum for one who wants leaflet sending (client) and in the form of movie, data generated by editing scenes of school lessens which were recorded in the past (e.g. previous school year) in attending-school or correspondence-class (correspondence class realized by mailing of printed teaching materials, correspondence class in the form of distance learning through the Internet, etc.) chairs and lecture meetings presented by such educational organizations as universities, preparatory schools and private schools, data generated by editing interview scenes recorded in the past (e.g. previous school year) of lecturers in charge of attending-school or correspondence-class (correspondence class realized by mailing of printed teaching materials, correspondence class in the form of distance learning through the Internet, etc.) chairs and lecture meetings presented by such educational organizations as universities, preparatory schools and private schools, data generated by recording and editing interview scenes of students who in the past took attending-school or correspondence-class (correspondence class realized by mailing of printed teaching materials, correspondence class in the form of distance learning through the Internet, etc.) chairs and lecture meetings presented by such educational organizations as universities, preparatory schools and private schools, or data generated by editing teaching materials and transcripts of lectures (or resumes) of attending-school or correspondence-class (correspondence class realized by mailing of printed teaching materials, correspondence class in the form of distance learning through the Internet, etc.) chairs and lecture meetings held in the past by such educational organizations as universities, preparatory schools and private schools, on an icon displayed on the display (not shown) of the PC on the side of the one who wants sending of a leaflet (client terminal 40 on the side of the one who wants leaflets to be sent) through the internet 10.

As a result, more profound sensible comprehension of the contents and atmosphere of school lessons of chairs and lecture meetings prepared in a leaflet selected as a leaflet (electronic leaflet) optimum for one who wants leaflet sending (client) is enabled than that by a conventional process of watching and selecting printed leaflets using paper media. In other words, providing one who wants leaflet sending (client) with virtual reality space that can not be attained by a conventional process of watching and selecting printed leaflets using paper media improves the degree of understanding of a leaflet (electronic leaflet) more drastically than by a conventional process of watching and selecting printed leaflets using paper media.

The user access authentication unit 70 has a function of checking right to access (to be specific, registered as a member or not, party with which fee is to be charged, etc.) of one who wants sending of a leaflet (client) when the client terminal 40 (PC) of the one who wants sending of a leaflet accesses a web site of the server 210 and if the one who wants sending of a leaflet (client) has the right to access (to be specific, when the one who wants leaflet sending is registered as a member), informing the electronic leaflet system 200 side (the server 210 side) of the allowance of access of the one who wants leaflet sending (client) to the electronic leaflet system 200. The function is realized by a computer resource (to be specific, a CPU (central processing unit), a memory, a hard disc or the like) and a program managed by the server 210. When the one who wants leaflet sending (client) has no right to access, it is also possible to indicate to that effect on a display (not shown) of the client terminal 40 (PC) of the one who wants sending of a leaflet to promote member registration.

By thus checking right to access (to be specific, registered as a member or not, party with which fee is to be charged, etc.) of one who wants leaflet sending (client) when the one who wants leaflet sending accesses a web site and if the one who wants leaflet sending (client) has the right to access (to be specific, when the one who wants leaflet sending is registered as a member), allowing the one who wants leaflet sending (client) to access the electronic leaflet system 200, the system produces the effect of reliably charging the one who want leaflet sending (client) allowed to access fee-charging services according to the service contents.

The selection supporting unit 60 includes the question unit 80 and the electronic leaflet presenting unit 90.

The question unit 80 includes the mock examination icon 105, the mock examination sending unit 110 and the mock examination determination unit 120 and has a function of receiving various conditions presented by one who wants leaflet sending (client) allowed by the user access authentication unit 70 to make an access by clicking an icon (in practice, icon displayed on a display (not shown) of the client terminal 40 (PC) on the side of the one who wants leaflet sending (client)) in a web site of the server 210 to designate various kinds of selection items (to be specific, ability and qualification required for taking a chair or a lecture meeting (to be specific, age, sex, etc.), budget, school lesson schedule, qualifying schedule, etc.) set in advance related to icons. The function is realized by a computer resource (to be specific, a CPU (central processing unit), a memory, a hard disc or the like) and a program managed by the server 210.

The question unit 80 is also allowed to receive various conditions presented by one who wants leaflet sending (client) allowed by the user access authentication unit 70 to make an access by clicking an icon (in practice, icon displayed on a display (not shown) of the client terminal 40 (PC) on the side of the one who wants leaflet sending (client)) in a web site of the server 210 to designate through the internet 10 various kinds of selection items (to be specific, ability and qualification required for taking a chair or a lecture meeting (age, sex, etc.), budget, school lesson schedule, qualifying schedule, etc.) set in advance related to icons.

Various kinds of selection items set in the question unit 80 in advance includes a condition related to at least one of ability and qualification (age, sex, etc.) required for taking attending-school or correspondence-class (correspondence class realized by mailing of printed teaching materials, correspondence class in the form of distance learning through the Internet, etc.) chairs and lecture meetings presented by such educational organizations as universities, preparatory schools and private schools, budget, school lesson schedule and qualifying schedule.

The mock examination icon 105 in the question unit 80 is an icon (pictorial symbol) enabling selection of a mock examination which supports self-determination of basic scholastic ability and aptitude required for taking attending-school or correspondence-class (correspondence class realized by mailing of printed teaching materials, correspondence class in the form of distance learning through the Internet, etc.) chairs and lecture meetings presented by such educational organizations as universities, preparatory schools and private schools, which icon is realized by a computer resource (to be specific, a CPU (central processing unit), a memory, a hard disc or the like) and a program managed by the server 210.

The mock examination sending unit 110 has a function of sending question data of a mock examination to the client terminal 40 (PC) on the side of one who wants leaflet sending through the internet 10 when the one who wants leaflet sending (client) allowed to make an access by the user authentication unit 70 clicks the mock examination icon 105 in a web site of the server 210. The function is realized by a computer resource (to be specific, a CPU (central processing unit), a memory, a hard disc or the like) and a program managed by the server 210.

The mock examination determination unit 120 has a function of receiving answer data (documents and images described with such electronic document description languages as SGML and HTML) from the client terminal 40 (PC) on the side of one who wants leaflet sending to mark (correct) the answer data (documents and images described with such electronic document description languages as SGML and HTML) and generating various conditions including current ability of the one who wants leaflet sending (client), ability required for taking a chair or a lecture meeting, a kind of chair or lecture meeting recommended and a specific name of a chair or a lecture meeting to output the generated conditions to the electronic leaflet browsing supporting unit 50 based on the marking (correction) result. The function is realized by a computer resource (to be specific, a CPU (central processing unit), a memory, a hard disc or the like) and a program managed by the server 210.

Thus, the system produces the effect of selecting a mock examination which supports self-determination of basic scholastic ability and aptitude required for taking attending-school or correspondence-class (correspondence class realized by mailing of printed teaching materials, correspondence class in the form of distance learning through the Internet, etc.) chairs and lecture meetings presented by such educational organizations as universities, preparatory schools and private schools, sending question data of a mock examination to the terminal of one who wants leaflet sending (client) through the internet 10 when the one who wants leaflet sending (client) allowed to make an access by the user authentication unit 70 clicks the mock examination icon 105 in a web site, receiving answer data (documents and images described with such electronic document description languages as SGML and HTML) from one who wants leaflet sending to mark (correct) the answer data to generate various conditions including current ability of the one who wants leaflet sending (client), ability required for taking a chair or a lecture meeting, a kind of chair or lecture meeting recommended and a specific name of a chair or a lecture meeting, and selecting a predetermined number (at least one) of electronic leaflets to present (distribution through the net) them to the one who wants leaflet sending (client) in descending order of suitability for ability and qualification (age, sex, etc.) required for taking attending-school or correspondence-class (correspondence class realized by mailing of printed teaching materials, correspondence class in the form of distance learning through the internet, etc.) chairs and lecture meetings presented by such educational organizations as universities, preparatory schools and private schools, budget, school lesson schedule and qualifying schedule.

As a result, a chair or a lecture meeting required most by one who wants leaflet sending (client) can be introduced by making the most of interactivity characteristic of the internet 10 and web browser (browsing software). On the other hand, one who wants a leaflet to be sent (client) is allowed to objectively recognize his or her own weak point or a subject to be supplemented. In addition, an optimum leaflet (electronic leaflet) introducing a chair and a lecture meeting directed to his or her weak point or a subject to be supplemented can be obtained in much shorter time, with much less labor and much less costs and to much higher search precision than by a conventional process of watching and selecting printed leaflets using paper media.

The electronic leaflet presenting unit 90 has a function of searching the electronic leaflet data base 30 to select, among electronic leaflets (leaflet data described with such electronic document description languages as SGML and HTML) accumulated in the electronic leaflet data base 30, at least one electronic leaflet matched most to various conditions input by the one who wants leaflet sending (client) (to be specific, chair and lecture meeting the one wishes to take, the degree of difficulty, qualification the one wishes to take, desired place, desired budget, and desired school lesson schedule, etc.) and presenting (distribution through the net) them to the client terminal 40 (PC) on the side of the one who wants leaflet sending through the internet 10 based on the received various conditions (to be specific, chairs and lecture meetings the one wishes to take, the degree of difficulty, qualification the one wishes to take, desired place, desired budget, desired school lesson schedule, etc.). The function is realized by a computer resource (to be specific, a CPU (central processing unit), a memory, a hard disc or the like) and a program managed by the server 210.

In addition, the electronic leaflet presenting unit 90 searches the electronic leaflet data base 30 based on the various conditions (to be specific, chair and lecture meeting the one wishes to take, the degree of difficulty, qualification one wishes to take, desired place, desired budget, desired school lesson schedule, etc.) received from the question unit 80. The unit is also capable of selecting, from among electronic leaflets (leaflet data described with such electronic document description languages as SGML and HTML) accumulated in the electronic leaflet data base 30, a predetermined number (to be specific, about ten) of electronic leaflets in descending order of suitability for various conditions (to be specific, chair and lecture meeting the one wishes to take, the degree of difficulty, qualification one wishes to take, desired place, desired budget, desired school lesson schedule, etc.) input by the one who wants leaflet sending (client) and presenting (distribution through the net) them to the client terminal 40 (PC) on the side of the one who wants leaflet sending.

The charging unit 130 has a function of charging an educational organization according to the volume of data at new registration or updating of contents data (contents described with such electronic document description languages as SGML and HTML) of an electronic leaflet conducted at the electronic leaflet generation unit 20 and a function of charging an educational organization according to the volume of data at new registration or updating of contents data (contents described with such electronic document description languages as SGML and HTML) of an electronic leaflet made in the electronic leaflet data base 30. The functions are realized by a computer resource (to be specific, a CPU (central processing unit), a memory, a hard disc or the like) and a program managed by the server 210.

By thus charging an educational organization according to the volume of data at new registration or updating of contents data (documents and images described with such electronic document description languages as SGML and HTML) of an electronic leaflet conducted at the server 210 and charging an educational organization according to the volume of data at new registration or updating of contents data (contents described with such electronic document description languages as SGML and HTML) of an electronic leaflet made in the electronic leaflet data base 30, the system produces the effect of reliably executing processing of charging an educational organization as a user of a web site on the server 210 side according to service contents.

Figure 5:
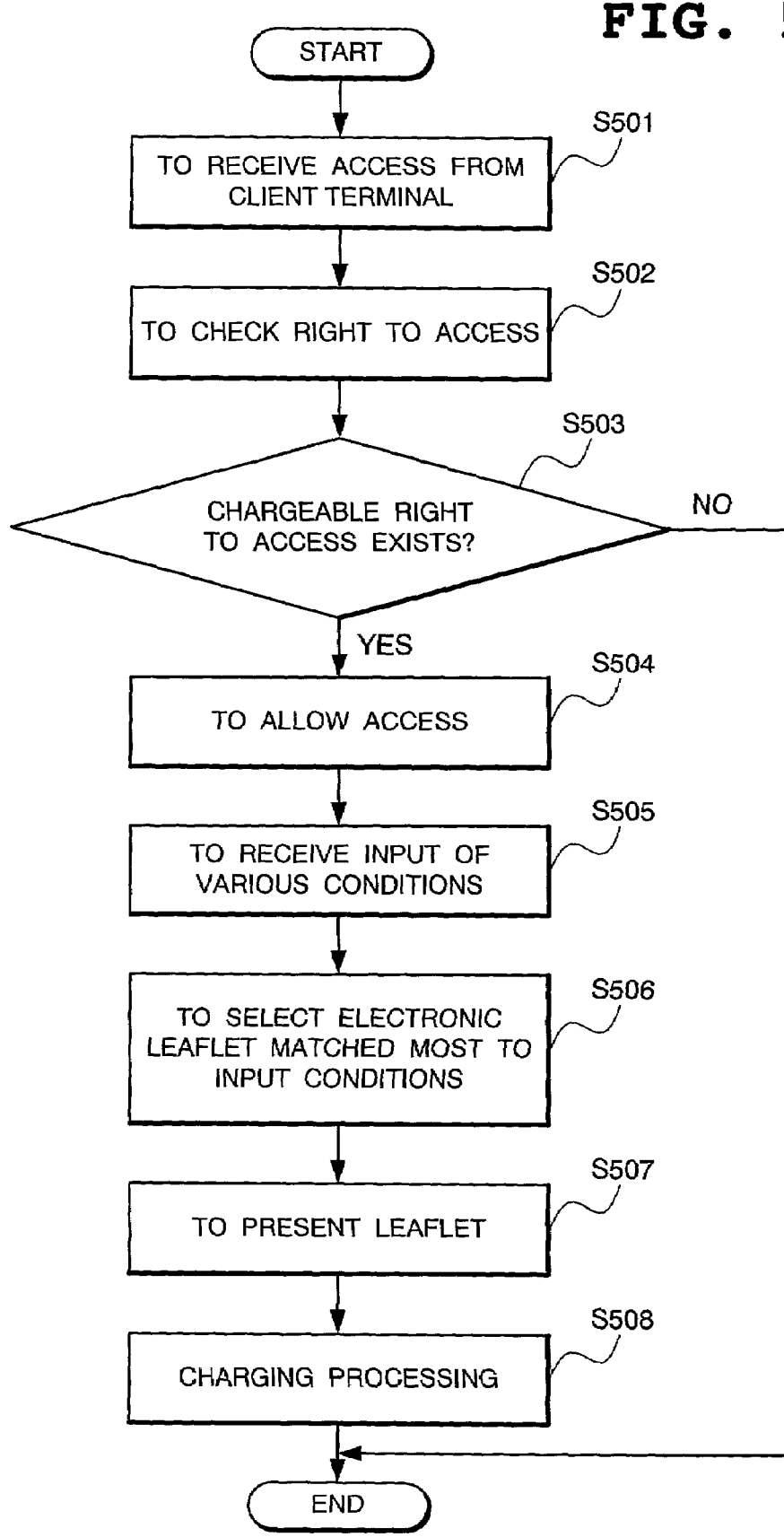
FIG. 5 is a flow chart for use in explaining charging operation of the electronic leaflet system according to one embodiment of the present invention.

Next, charging operation of the electronic leaflet system 200 of the present embodiment will be described with reference to the flow chart of FIG. 5.

First, when the client terminal 40 (PC) on the side of one who wants leaflet sending accesses a web site of the server 210 (Step S501), the user access authentication unit 70 checks right to access of the one who wants leaflet sending (client) (to be specific, registered/not registered as a member, party with which fee is to be charged, etc.) (Step S502). Then, when the one who wants leaflet sending (client) has chargeable right to access (Step S503) (to be specific, when one who wants leaflet sending is registered as a member), the unit informs the charging unit 130 and the selection supporting unit 60 that access (downloading) to chargeable moving picture data, voice data and document data by the one who wants leaflet sending (client) is allowed (Step S504).

Responsively, the selection supporting unit 60 receives by means of the question unit 80 various conditions presented by the one who wants leaflet sending (client) allowed by the user access authentication unit 70 to access by clicking an icon (in practice, icon displayed on a display (not shown) of the client terminal 40 (PC) of the one who wants leaflet sending) in a web site of the server 210 to designate various kinds of selection items set in advance related to icons (to be specific, ability and qualification (to be specific, age, sex, etc.) required for taking a chair and a lecture meeting, budget, school lesson schedule, qualifying schedule, etc.) (Step S505).

Furthermore, based on the various conditions (to be specific, chairs and lecture meetings the one wishes to take, the degree of difficulty, qualification one wishes to take, desired place, desired budget, desired school lesson schedule, etc.) received by means of the electronic leaflet presenting unit 90, search the electronic leaflet data base 30 and select, from among chargeable (target to be charged, i.e. target with which fee is charged) electronic leaflets (leaflet data described with such electronic document description languages as SGML and HTML) accumulated in the electronic leaflet data base 30, a chargeable (target to be charged, i.e. target with which fee is charged) electronic leaflet matched the most to various conditions input by the one who wants leaflet sending (client) (to be specific, chair and lecture meeting the one wishes to take, the degree of difficulty, desired qualification to take, desired place of a chair or a lecture, desired budget, desired school lesson schedule, etc.) (Step S506) to present (distribution through the net) them to the client terminal 40 (PC) on the side of the one who wants leaflet sending through the internet 10 (Step S507).

Responsively, the charging unit 130 charges the one who wants leaflet sending (client) according to conditions of accesses to a chargeable (target to be charged, i.e. target with which fee is charged) electronic leaflet (in other words, execute settlement procedure) (Step S508).

When chargeable moving picture data, voice data and document data are sent to the chargeable client terminal 40 (PC) of one who wants sending of a leaflet (target with which fee is charged) through the internet 10 (net distribution), the charging unit 130 also executes processing of charging the one who wants sending of a leaflet (client).

As described in the foregoing, the present embodiment produces the effect of selecting, from among electronic leaflet (data of leaflets (ordinarily, printed leaflet) provided by the side of a provider of teaching materials) of attending-school or correspondence-class (correspondence class realized by mailing of printed teaching materials, correspondence class in the form of distance learning through the Internet, etc.) chairs and lecture meetings held by a plurality of educational organizations including universities, preparatory schools, professional schools, various kinds of schools, training schools, cultural schools (e.g. cooking, instrument play, etc.) and private schools for elementary schools, secondary schools and high schools, a predetermined number (or at least one) of electronic leaflets matched the most to various conditions input by one who wants leaflet sending (client) (to be specific, chair and lecture meeting the one wishes to take, the degree of difficulty, desired qualification to take, desired place of a chair or lecture meeting, desired budget, desired school lesson schedule, etc.) in descending order of suitability and presenting (distribution through the net) them to the one who wants leaflet sending (client) by designating various kinds of selection items (to be specific, ability and qualification required for taking a chair or a lecture meeting (age, sex, etc.), budget, school lesson schedule, qualifying schedule, etc.) set on a window using an icon within the web site.

Therefore, one who wants leaflet sending (client) is allowed to browse leaflets of attending-school or correspondence-class (correspondence class realized by mailing of printed teaching materials, correspondence class in the form of distance learning through the Internet, etc.) chairs or lecture meetings held by educational organizations including universities, preparatory schools and private schools on an icon displayed on a display (not shown) of the PC (client terminal 40 on the side of one who wants leaflet sending) of the one who wants leaflet sending (client) through the internet 10 in descending order of suitability to his or her own ability, budget, schedule, etc. As a result, by making the most of interactivity characteristic of the internet 10 and web browser (browsing software), a leaflet (electronic leaflet) optimum for the one who wants leaflet sending (client) can be obtained in much shorter time, with much less labor and much less costs and to much higher search precision than by a conventional process of watching and selecting printed leaflets using paper media.

Figure 6:
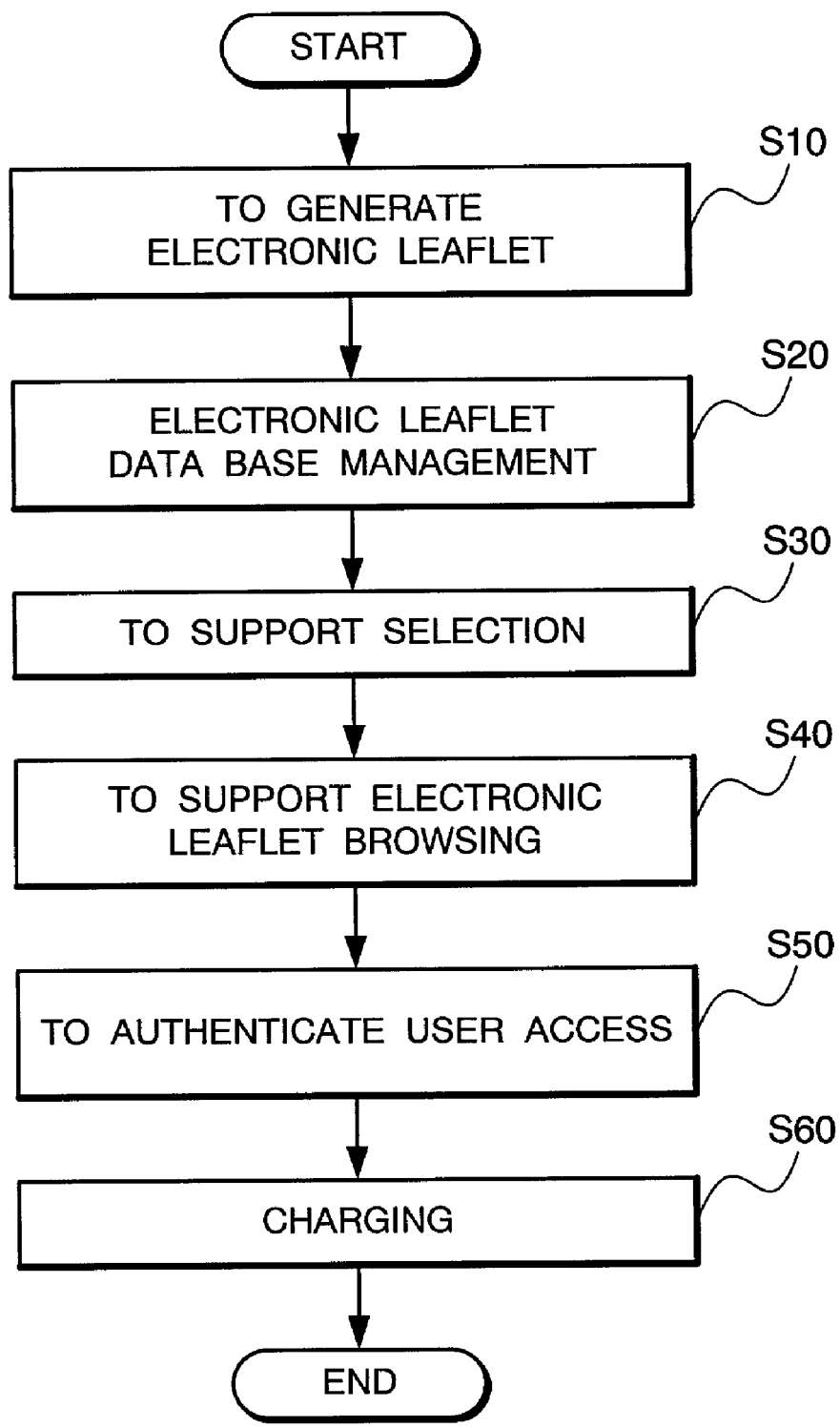
FIG. 6 is a flow chart for use in explaining processing of an electronic leaflet distribution/browsing method executed by the electronic leaflet system according to one embodiment of the present invention.
Figure 7:
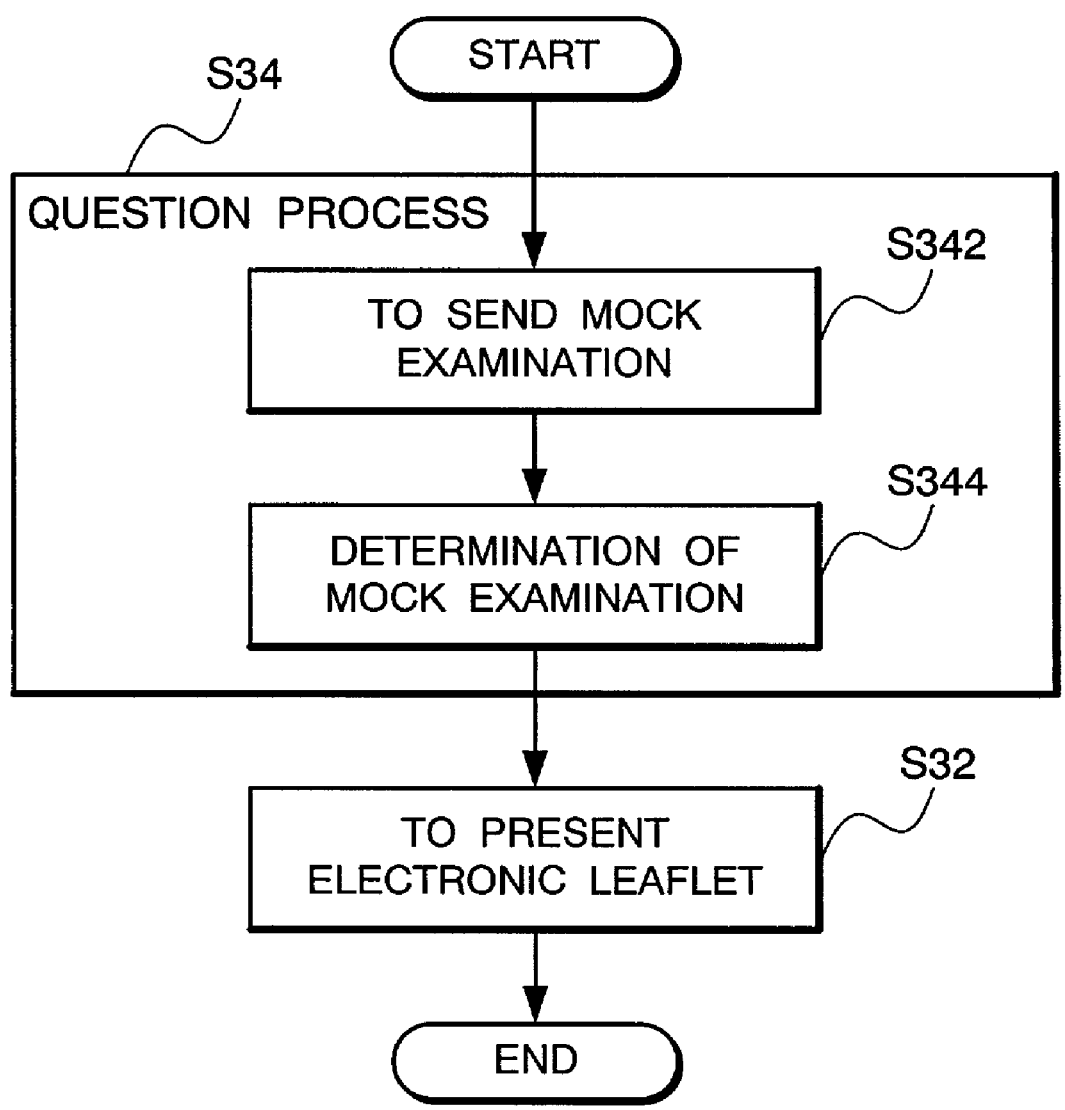
FIG. 7 is a flow chart for use in explaining processing of the electronic leaflet distribution/browsing method executed by the electronic leaflet system according to one embodiment of the present invention.

Next, an electronic leaflet distribution/browsing method executed by the electronic leaflet system 200 of the present embodiment will be described with reference to the flow charts of FIGS. 4, 6 and 7.

The electronic leaflet distribution/browsing method of the present embodiment includes an electronic leaflet generation process (Step S10, the executing subject is the electronic leaflet generation unit 20), an electronic leaflet data base management process (Step S20, the executing subject is the electronic leaflet system 200), a selection supporting process (Step S30, the executing subject is the selection supporting unit 60) having an electronic leaflet presenting process (Step S32, the executing subject is the electronic leaflet presenting unit 90) and a question process (Step S34, the executing subject is the question unit 80), an electronic leaflet browsing supporting process (Step S40, the executing subject is the electronic leaflet browsing supporting unit 50) having the movie reproduction process (Step S42, the executing subject is the movie reproduction unit 100), a user access authentication process (Step S50, the executing subject is the user access authentication unit 70) and a charging process (Step S60, the executing subject is the charging unit 130).

Furthermore, the question process (Step S34, the executing subject is the question unit 80) includes a mock examination sending process (Step S342, the executing subject is the mock examination sending unit 110) and a mock examination determination process (Step S344, the executing subject is the mock examination determination unit 120).

The electronic leaflet generation process (Step S10, the executing subject is the electronic leaflet generation unit 20) is a process by the server 210 on the side of the web site to make into electronic information the contents data (contents documents and images described with such electronic document description languages as SGML and HTML) related to leaflets (leaflets presented by a supplier of teaching materials (ordinarily, printed leaflets)) of attending-school or correspondence-class (correspondence class realized by mailing of printed teaching materials, correspondence class in the form of distance learning through the Internet, etc.) chairs and lecture meetings held by a plurality of educational organizations including universities, preparatory schools, professional schools, various kinds of schools, training schools, cultural schools (e.g. cooking, instrument play, etc.) and private schools for elementary schools, secondary schools and high schools to generate and output electronic leaflets by designating various kinds of selection items set on a window by using an icon within the web site of the server 210. The process is described with program codes.

The electronic leaflet data base management process (Step S20, the executing subject is the electronic leaflet system 200) is a process of making electronic leaflets generated and output by the electronic leaflet generation process (Step S10, the executing subject is the electronic leaflet generation unit 20) into a data base having a predetermined layered structure (to be specific, data structure in which sub-menus are layered) and preserving the obtained leaflets in the electronic leaflet data base 30. The process is described with program codes.

The selection supporting process (Step S30, the executing subject is the selection supporting unit 60) is a process by the server 210 on the web site side accessible to the internet 10 to select, from among electronic leaflets (leaflet data described with such electronic document description languages as SGML and HTML), at least one electronic leaflet optimum for various conditions presented by one who wants sending of a leaflet (client) and presenting (distribution through the net) the same to the client terminal 40 (PC) on the side of one who wants sending of a leaflet through the internet 10 according to various conditions (to be specific, chair and lecture meeting the one wishes to take, the degree of difficulty, desired qualification to take, desired place of a chair or lecture meeting, desired budget, desired school lesson schedule, etc.) presented by the one who wants leaflet sending (client) by designating various kinds of selection items (ability and qualification required for taking a chair or a lecture meeting (to be specific, age, sex, etc.), budget, school lesson schedule, qualifying schedule, etc. of attending-school or correspondence-class (correspondence class realized by mailing of printed teaching materials, correspondence-class in the form of distance learning through the Internet, etc.) chairs and lecture meetings held by educational organizations including universities, preparatory schools and private schools) set in advance related to an icon within the web site of the server 210. The process is described with program codes.

The electronic leaflet browsing supporting process (Step S40, the executing subject is the electronic leaflet browsing supporting unit 50) is a process of promoting understanding of contents (contents documents and images described with such electronic document description languages as SGML and HTML) prepared in an electronic leaflet selected as a result of automatic reproduction (movie reproduction, in particular), on a display (not shown) of the client terminal 40 (PC) of one who wants leaflet sending, of contents (contents documents and images described with such electronic document description languages as SGML and HTML) contained in a sub-menu (not shown) prepared in the selected electronic leaflet in response to a request from one who wants leaflet sending (client). The process is described with program codes.

User access authentication process (Step S50, the executing subject is the user access authentication unit 70) is a process of checking right to access (to be specific, registered as a member or not, party with which fee is to be charged, etc.) of one who wants leaflet sending (client) when the one who wants leaflet sending (client) accesses a web site and if the one who wants leaflet sending (client) has the right to access (to be specific, when the one who wants leaflet sending is registered as a member), informing the web site side server 210 that access to the web site side server 210 by the client terminal 40 (PC) of the one who wants leaflet sending (client) is allowed. The process is described with program codes.

When the one who wants leaflet sending (client) has no right to access, it is possible to indicate to that effect on a display (not shown) of the client terminal 40 (PC) of the one who wants leaflet sending to promote member registration.

The question process (Step S34, the executing subject is the question unit 80) in the selection supporting process (Step S30, the executing subject is the selection supporting unit 60) is a process of receiving various conditions presented by one who wants leaflet sending (client) allowed to make an access by the user access authentication process (Step S50, the executing subject is the user access authentication unit 70) by clicking an icon (icon displayed on a display (not shown) of the client terminal 40 (PC) on the side of the one who wants leaflet sending (client)) in the web site to designate various kinds of selection items (to be specific, ability and qualification required for taking a chair or a lecture meeting (age, sex, etc.), budget, school lesson schedule, qualifying schedule, etc.) set in advance related to icons. The process is described with program codes.

The question process (Step S34, the executing subject is the question unit 80) is also allowed to receive various conditions presented by one who wants leaflet sending (client) allowed to make an access by the user access authentication process (Step S50, the executing subject is the user access authentication unit 70) by clicking an icon (in practice, icon displayed on a display (not shown) of the client terminal 40 (PC) on the side of the one who wants leaflet sending) in the web site to designate through the internet 10 various kinds of selection items (to be specific, ability and qualification required for taking a chair or a lecture meeting (age, sex, etc.), budget, school lesson schedule, qualifying schedule, etc.) set in advance related to icons.

Various kinds of selection items set in the question process (Step S34, the executing subject is the question unit 80) in advance includes conditions related to at least one of ability and qualification (age, sex, etc.) required for taking attending-school or correspondence-class (correspondence class realized by mailing of printed teaching materials, correspondence class in the form of distance learning through the Internet, etc.) chairs and lecture meetings presented by such educational organizations as universities, preparatory schools and private schools, budget, school lesson schedule and qualifying schedule.

The electronic leaflet presenting process (Step S32, the executing subject is the electronic leaflet presenting unit 90) in the selection supporting process (Step S30, the executing subject is the selection supporting unit 60) is a process of searching the electronic leaflet data base 30 to select, among electronic leaflets (leaflet data described with such electronic document description languages as SGML and HTML) accumulated in the electronic leaflet data base 30, at least one electronic leaflet matched the most to various conditions (to be specific, chair and lecture meeting the one wishes to take, the degree of difficulty, desired qualification to take, desired place, desired budget, desired school lesson schedule, etc.) input by the one who wants leaflet sending (client).

Then, it is the process of presenting (distribution through the net) the selected electronic leaflet to the client terminal 40 (PC) on the side of the one who wants leaflet sending through the internet 10. The process is described with program codes.

Also in the electronic leaflet presenting process (Step S32, the executing subject is the electronic leaflet presenting unit 90), search the electronic leaflet data base 30 based on the various conditions (to be specific, chair and lecture meeting the one wishes to take, the degree of difficulty, desired qualification to take, desired place, desired budget, desired school lesson schedule, etc.) received from the question process (Step S34, the executing subject is the question unit 80).

In this process, it is further possible to select, from among electronic leaflets (leaflet data described with such electronic document description languages as SGML and HTML) accumulated in the electronic leaflet data base 30, a predetermined number (to be specific, about ten) of electronic leaflets in descending order of suitability for various conditions input by one who wants leaflet sending (client) (to be specific, chair and lecture meeting the one wishes to take, the degree of difficulty, desired qualification to take, desired place, desired budget, desired school lesson schedule, etc.) and present (distribution through the net) them to the client terminal 40 (PC) on the side of the one who wants leaflet sending (client).

The movie reproduction process (Step S42, the executing subject is the movie reproduction unit 100) in the electronic leaflet browsing supporting process (Step S40, the executing subject is the electronic leaflet browsing supporting unit 50) is a process of automatically reproducing (movie reproduction in particular) moving picture data, voice data and documents data on a display (not shown) of the client terminal 40 (PC) on the side of one who wants a leaflet to be sent when an electronic leaflet in which moving picture data, voice data and document data are prepared in advance as contents (contents documents and images described with such electronic document description languages as SGML and HTML) is selected by the one who wants a leaflet to be sent (client), thereby promoting understanding of the contents prepared in the selected electronic leaflet. The process is described with program codes.

The mock examination sending process (Step S342, the executing subject is the mock examination sending unit 110) in the question process (Step S34, the executing subject is the question unit 80) is a process of sending question data of a mock examination to the client terminal 40 (PC) on the side of one who wants leaflet sending through the internet 10 when one who wants sending of a leaflet (client) allowed by the user access authentication process (Step S50, the executing subject is the user access authentication unit 70) to make an access clicks the mock examination icon 105 which enables selection of a mock examination for supporting self-determination of basic scholastic ability or aptitude required for taking attending-school or correspondence-class (correspondence class realized by mailing of printed teaching materials, correspondence class in the form of distance learning through the internet, etc.) chairs and lecture meetings presented by such educational organizations as universities, preparatory schools and private schools. The process is described with program codes.

The mock examination determination process (Step S344, the executing subject is the mock examination determination unit 120) in the question process (Step S34, the executing subject is the question unit 80) is a process of receiving answer data (documents and images described with such electronic document description languages as SGML and HTML) from one who wants sending of a leaflet (client) to mark (correct) the answer data and generating various conditions including current ability of the one who wants leaflet sending (client), ability required for taking a chair or a lecture meeting, a kind of chair or lecture meeting recommended and a specific name of a chair or a lecture meeting to output the generated data to the electronic leaflet browsing supporting process (Step S40, the executing subject is the electronic leaflet browsing supporting unit 50) based on the marking (correction) result. The process is described with program codes.

The charging process (Step S60, the executing subject is the charging unit 130) is a process of charging an educational organization according to the volume of data at new registration or updating of contents data (contents described with such electronic document description languages as SGML and HTML) of an electronic leaflet conducted in the electronic leaflet generation process (Step S10, the executing subject is the electronic leaflet generation unit 20). The process is described with program codes.

The charging process (Step S60, the executing subject is the charging unit 130) also allows charging of an educational organization according to the volume of data at new registration or updating of contents data (contents described with such electronic document description languages as SGML and HTML) of an electronic leaflet made in the electronic leaflet data base 30.

Next, description will be made of the charging process (Step S60, the executing subject is the charging unit 130) of the electronic leaflet distribution/browsing method of the present embodiment. First, in a case where when the user access authentication process (Step S50, the executing subject is the user access authentication unit 70) checks right to access (to be specific, registered/not registered as member, party with which fee is to be charged, etc.) of one who wants leaflet sending (client) at the time when the one who wants leaflet sending (client) makes an access to the server 210 on the web site side, if the one who wants leaflet sending (client) has chargeable right to access (to be specific, the one who wants leaflet sending is a registered member), inform the charging process ((Step S60, the executing subject is the charging unit 130) and the selection supporting process (Step S30, the executing subject is the selection supporting unit 60) that access to chargeable moving picture data, voice data and document data by the one who wants leaflet sending (client) is allowed.

Responsively, the selection supporting process (Step S30, the executing subject is the selection supporting unit 60) receives, by means of the question process (Step S34, the executing subject is the question unit 80), various conditions presented by the one who wants leaflet sending (client) allowed to access by the user access authentication process (Step S50, the executing subject is the user access authentication unit 70) by clicking an icon (in practice, icon displayed on a display (not shown) of the client terminal 40 (PC) on the side of the one who wants leaflet sending (client)) in the web site to designate various kinds of selection items (to be specific, ability and qualification required for taking a chair or a lecture meeting (age, sex, etc.), budget, school lesson schedule, qualifying schedule, etc.) set in advance related to icons.

Furthermore, search the electronic leaflet data base 30 based on the various conditions received by using the electronic leaflet presenting process (Step S32, the executing subject is the electronic leaflet presenting unit 90) to select, from among chargeable (target to be charged, i.e. party with which fee is charged) electronic leaflets (leaflet data described with such electronic document description languages as SGML and HTML) accumulated in the electronic leaflet data base 30, a chargeable (target to be charged, i.e. party with which fee is charged) electronic leaflet most matched to various conditions input by one who wants leaflet sending (client) (to be specific, chair and lecture meeting the one wishes to take, the degree of difficulty, desired qualification to take, desired place, desired budget, desired school lesson schedule, etc.) and present (distribution through the net) the selected leaflet to the client terminal 40 (PC) of the one who wants leaflet sending through the internet 10.

Responsively, the charging process (Step S60, the executing subject is the charging unit 130) charges the one who wants leaflet sending (client) (in other words, execute settlement processing) according to conditions of access to a chargeable (target to be charged, i.e. party with which fee is to be charged) electronic leaflet. When fee-charging moving picture data, voice data and document data are sent through the internet 10 (distribution through the net) to a chargeable one who wants sending of a leaflet (client) (target with which fee is to be charged), the process also executes processing of charging one who wants leaflet sending (client).

It is clearly understood that the present invention is not limited to the above-described embodiments and that the embodiments can be appropriately modified within a scope of the technical idea of the present invention. The number, position, configuration and the like of the above-described components are not limited to those of the above-described embodiments and they may be any number, position, configuration and the like suitable for implementing the present invention.

Being thus structured, the present invention achieves the following effects.

Firstly, by designating various kinds of selection items set in a web site using an icon, a predetermined number (or at least one) of electronic leaflets can be selected and presented to one who wants leaflet sending among leaflets of attending-school or correspondence-class chairs and lecture meetings provided by a plurality of educational organizations such as universities, preparatory schools, professional schools, cultural schools, and private schools for elementary/junior/high schools in descending order of suitability for various conditions input by the one who wants leaflet sending (ability and qualification required for taking attending-school or correspondence-class chairs and lecture meetings provided by educational organizations such as universities, preparatory schools and private schools, budget, school lesson schedule, qualifying schedule, etc.).

Therefore, the effect is produced that one who wants a leaflet to be sent is allowed to sequentially browse leaflets of attending-school or correspondence-class chairs and lecture meetings held by such educational organizations as universities, preparatory schools and private schools on a PC of the one who wants leaflets to be sent through the Internet in descending order of suitability for his ability, budget, schedule, etc. As a result, the leaflet (electronic leaflet) most suitable for the one who wants sending of leaflets can be obtained in much shorter time, with much less labor and much less costs and to much higher search precision by making the most of interactivity characteristic of the Internet and web browser (browsing software) than by a conventional process of watching and selecting printed leaflets using paper media.

Secondly, by automatically reproducing the contents (moving picture data, voice data and/or document data) contained in a sub-menu prepared in advance within a selected electronic leaflet in question on a display of one who wants a leaflet to be sent (client) according to a request of the one who wants a leaflet to be sent (client), among attending-school or correspondence-class chairs and lecture meetings held by such educational organizations as universities, preparatory schools and private schools, a leaflet (electronic leaflet) most suitable for ability, budget, schedule and the like of the one who wants sending of leaflets can be automatically reproduced in the form of movie on the PC of the one who wants sending of leaflets (client terminal on the side of the one who wants leaflets to be sent) through the Internet in descending order of suitability.

As a result, the degree of understanding of the contents prepared in a leaflet (electronic leaflet) selected as the leaflet (electronic leaflet) most appropriate for the one who wants the leaflet to be sent can be more drastically improved than by a conventional process of watching and selecting printed leaflets using paper media.

Thirdly, the processing of charging one who wants leaflet sending and who is allowed to make an access to fee-charging services can be reliably executed according to the contents of the service by checking right to access of one who wants a leaflet to be sent at the time of access to a web site and allowing the one in question to access the system when the one in question has right to access.

Fourthly, a leaflet (electronic leaflet) most suitable for ability, budget, schedule and the like of one who wants a leaflet to be sent can be automatically reproduced in the form of movie among leaflets of attending-school or correspondence-class chairs and lecture meetings held by such educational organizations as universities, preparatory schools and private schools on a PC of the one who wants sending of leaflets (client terminal on the side of the one who wants leaflets to be sent) through the Internet in descending order of suitability by automatically reproducing contents contained in a sub-menu prepared in advance in a selected electronic leaflet in question according to a request of the one who wants a leaflet to be sent on a display of the one in question.

As a result, the degree of understanding of the contents prepared in the leaflet (electronic leaflet) selected as an optimum leaflet (electronic leaflet) for the one who wants a leaflet to be sent can be more drastically improved than by a conventional process of watching and selecting printed leaflets using paper media.

Fifthly, as moving picture data, voice data and/or document data of a leaflet (electronic leaflet) selected as an optimum leaflet (electronic leaflet) for one who wants leaflet sending, automatic reproduction in the form of movie on a PC (client terminal on the side of the one who wants leaflets to be sent) of the one who wants sending of a leaflet through the Internet is possible of data generated by editing scenes of school lessens of attending-school or correspondence-class chairs and lecture meetings presented by such educational organizations as universities, preparatory schools and private schools which were recorded in the past, data generated by recording and editing interview scenes of students who in the past took attending-school or correspondence-class chairs and lecture meetings presented by such educational organizations as universities, preparatory schools and private schools, data generated by editing interview scenes of instructors who were in charge of attending-school or correspondence-class chairs and lecture meetings presented by such educational organizations as universities, preparatory schools and private schools which were recorded in the past, or data generated by editing teaching materials and transcripts of lectures of attending-school or correspondence-class chairs and lecture meetings held by such educational organizations as universities, preparatory schools and private schools in the past.

As a result, more profound sensible comprehension of the contents and atmosphere of school lessons of chairs and lecture meetings prepared in a leaflet (electronic leaflet) which is selected as a leaflet (electronic leaflet) optimum for one who wants leaflet sending is enabled than that by a conventional process of watching and selecting printed leaflets using paper media. In other words, providing one who wants leaflet sending with virtual reality space that can not be attained by a conventional process of watching and selecting printed leaflets using paper media more drastically improves the degree of understanding of a leaflet (electronic leaflet) than by a conventional process of watching and selecting printed leaflets using paper media.

Sixth effect is selecting a mock examination which supports self-determination of basic scholastic ability and aptitude required for taking attending-school or correspondence-class chairs and lecture meetings presented by such educational organizations as universities, preparatory schools and private schools, sending question data of a mock examination to the client terminal of one who wants leaflet sending in question through the Internet when one who wants leaflet sending and who is allowed to make an access by the user access authentication unit clicks the relevant mock examination icon within a web site, receiving the answer data from the one who wants leaflet sending to mark the answer data and generating various conditions including current ability of the one who wants leaflet sending, ability required for taking a chair or a lecture meeting, a kind of chair or lecture meeting recommended and a specific name of a chair or a lecture meeting based on the marking result to select and present a predetermined number (or at least one) of electronic leaflets to the one who wants leaflet sending in question in descending order of suitability for ability and qualification required for taking attending-school or correspondence-class chairs and lecture meetings presented by such educational organizations as universities, preparatory schools and private schools, budget, school lesson schedule and qualifying schedule.

As a result, a chair or a lecture meeting required most by one who wants leaflet sending can be introduced by making the most of interactivity characteristic of the Internet and web browser (browsing software). On the other hand, one who wants a leaflet to be sent is allowed to objectively recognize his or her own weak point and a subject to be supplemented, while an optimum leaflet (electronic leaflet) introducing a chair and a lecture meeting directed to his or her weak point or a subject to be supplemented can be obtained in much shorter time, with much less labor and much less costs and to much higher search precision than by a conventional process of watching and selecting printed leaflets using paper media.

Seventh effect is that by charging an educational organization according to the volume of data at new registration or updating of contents data of an electronic leaflet conducted at a server and charging an educational organization according to the volume of data at new registration or updating of contents data of an electronic leaflet made in an electronic leaflet data base, reliable execution of processing of charging an educational organization as a user of a server side web site can be realized according to the contents of services.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An electronic leaflet distribution/browsing method comprising:
   generating by a server an electronic leaflet by making contents data related to leaflets concerning a plurality of educational organizations into an electronic information through designation of various kinds of selection items set in a web site of the server;
   organizing said generated electronic leaflet into a predetermined layered structure;
   storing said structured electronic leaflet in a database;
   selecting from the database at least one electronic leaflet optimum for various conditions presented by a user;
   transmitting by the server via an internet to the user the selected electronic leaflet;
   presenting the selected electronic leaflet on a client terminal to the user; and
   automatically reproducing on the client terminal the contents contained in a sub-menu prepared in advance in the selected electronic leaflet in response to a request from the user;
   charging the educational organization according to volume of data at new registration or updating of contents data of an electronic leaflet conducted during the generation of the leaflet,
   wherein the sub-menu promotes understanding of the contents in the selected electronic leaflet, and
   at least one optimum electronic leaflet is selected from electronic leaflets according to various conditions provided by the user, where the user specifies the various conditions via selecting various kinds of items related to icons on the web site of said servers,
   wherein the organizing of said electronic leaflet into the predetermined layered structure comprises generating menu options for the generated electronic leaflet and grouping contents data of the generated leaflet into a respective menu option.

2. The electronic leaflet distribution/browsing method as set forth in claim 1, wherein said electronic leaflet relates to at least one of lecture, school for attending-school education or correspondence course of a plurality of educational organizations.

3. The electronic leaflet distribution/browsing method as set forth in claim 1, further comprising:
   when the user accesses the web site, checking user rights for access and when the user is authorized to access the website, informing the web site of said server that the client terminal of the user is allowed to access the web site of said server.

4. The electronic leaflet distribution/browsing method as set forth in claim 3, wherein said selection of the at least one optimum electronic leaflet further comprises:
   receiving various conditions presented by the authorized user by clicking an icon on the web site to designate each kind of selection items related to the icon, and
   searching said electronic leaflet data base based on the received various conditions to select at least one electronic leaflet that most closely matches the various conditions input by the user and present, for the user, the selected electronic leaflet on said client terminal of the user.

5. The electronic leaflet distribution/browsing method as set forth in claim 3, wherein said selection of the at least one optimum electronic leaflet further comprises:
   receiving through the internet various conditions provided by the authorized user by clicking an icon on the web site to designate each kind of selection items related to the icon,
   searching said electronic leaflet data base based on the received various conditions to select a predetermined number of electronic leaflets in a descending order of suitability for the various conditions input by the user, and
   presenting the selected electronic leaflets to the client terminal of the user.

6. The electronic leaflet distribution/browsing method as set forth in claim 4, wherein the automatic reproduction of the contents of the selected electronic leaflet in the sub-menu comprises: when the selected electronic leaflet contains as prepared contents at least one of moving picture data, voice data, and document data, automatically reproducing the contents on the display of the client terminal of the user facilitating understanding of the contents prepared in the selected electronic leaflet.

7. The electronic leaflet distribution/browsing method as set forth in claim 6, wherein said at least one of moving picture data, voice data, and document data comprise data generated by editing scenes of recorded school lessons attended by students or online classes and lecture meetings held by the educational organizations.

8. The electronic leaflet distribution/browsing method as set forth in claim 6, wherein said at least one of moving picture data, voice data and document data comprise data generated by editing previously recorded interview scenes of lecturers in charge of attendance or online classes and lecture meetings held by educational organizations.

9. The electronic leaflet distribution/browsing method as set forth in claim 6, wherein said at least one of moving picture data, voice data and document data comprise data generated by recording and editing interview scenes of students who previously attended school or online classes and lecture meetings held by educational organizations.

10. The electronic leaflet distribution/browsing method as set forth in claim 6, wherein said at least one of moving picture data, voice data, and document data comprise data generated by editing teaching materials and transcripts of lectures presented in attending-school education or correspondence course of educational organizations.

11. The electronic leaflet distribution/browsing method as set forth in claim 4, wherein the various kinds of selection items designated by the user comprise a condition related to at least one of ability, qualification, budget, school lesson schedule and qualifying schedule for lecture in attending-school education or correspondence course of educational organizations.

12. The electronic leaflet distribution/browsing method as set forth in claim 11, wherein said designating by the user of the various kinds of selection items comprises:
   clicking by the authorized user a mock examination icon enabling selection of a mock examination for supporting self-determination of at least one of basic scholastic ability and aptitude, required for attending-school or online classes and lecture meetings held by educational organizations;
   sending via the internet question data of the mock examination to the client terminal of the user;
   receiving answer data from the user to mark the answer data;
   generating the various conditions, where the various conditions comprise current ability of the user, ability required for taking an online class or a lecture meeting, a kind of the online class or the lecture meeting recommended, and a specific name of the recommended online class or the recommended lecture meeting based on the marking result; and
   outputting the conditions to said automatic reproduction of the contents of the electronic leaflet.

13. The electronic leaflet distribution/browsing method as set forth in claim 1, wherein said charging the educational organization according to the volume of data at new registration or at updating of contents data of an electronic leaflet in said electronic leaflet data base.

14. The electronic leaflet distribution/browsing method as set forth in claim 1, wherein:
   when the user accesses the web site of said server, checking whether the user has a right to access the electronic leaflets, and if the user has a chargeable right to access, informing for said charging of the educational organization and for said selection of the at least one optimum electronic leaflet that the user is allowed to access at least one of chargeable moving picture data, chargeable voice data and chargeable document data;
   for said selection of the at least one optimum electronic leaflet, receiving said various conditions presented by the user, who is allowed to access the electronic leaflets, where said conditions are selected by clicking the icon on the web site to designate said each kind of selection items related to the icon, and searching said electronic leaflet data base based on the received various conditions to select a chargeable electronic leaflet, from the chargeable electronic leaflets accumulated in the electronic leaflet data base, that most closely matches the various conditions inputted by the user and presenting the user with the selected electronic leaflet via said client terminal of the user, and
   charging the user according to conditions of access to a chargeable electronic leaflet.

15. The electronic leaflet distribution/browsing method as set forth in claim 1, wherein when at least one moving picture data, voice data and document data are sent via the internet to the user, the user is charged for the sent data.

16. An electronic leaflet system, comprising:
   an electronic leaflet generation unit making contents data related to leaflets concerning a plurality of educational organizations into electronic information after the educational organizations register the content data through designation of various kinds of selection items set using icons on a web site;
   an electronic leaflet data base management unit creating for said generated electronic leaflet predetermined layered structure and storing the structured electronic leaflet into a data base;
   a selection supporting unit selecting at least one electronic leaflet optimum for various conditions provided by the user and presenting via an internet the selected electronic leaflet to a client terminal on a user side and to select at least one optimum electronic leaflet from electronic leaflets according to the various conditions provided by the user, where the user specifies the various conditions via selecting various kinds of items related to icons on the web site of a server; and
   an electronic leaflet browsing supporting unit, which in response to a request from the user automatically reproduces on a display of the client terminal the contents contained in a sub-menu prepared in advance in the selected electronic leaflet to facilitate understanding of the contents prepared in the selected electronic leaflet,
   wherein the electronic leaflet data base management unit creates, for said generated electronic leaflet, the predetermined layered structure by generating menu options for the generated electronic leaflet and by grouping contents data of the generated leaflet into a respective menu option.

17. The electronic leaflet system as set forth in claim 16, wherein said electronic leaflet relates to at least one of lecture, school for attending-school education or correspondence course of a plurality of educational organizations.

18. The electronic leaflet system as set forth in claim 16, further comprising a user access authentication unit for, when said client terminal of the user accesses the web site of said server, checking user right to access the electronic leaflets and when the user is authorized, informing the system that the user is authorized to access the electronic leaflets.

19. The electronic leaflet system as set forth in claim 18, wherein said selection supporting unit further comprises:
   a question unit receiving the various conditions presented by the authorized user by clicking an icon on the web site of said server to designate each kind of the selection items related to the icon; and
   an electronic leaflet presenting unit searching said electronic leaflet data base based on the received various conditions to select at least one electronic leaflet, from the electronic leaflets accumulated in the electronic leaflet data base, that most closely matches the various conditions input by the user and present through the internet the selected electronic leaflet to the client terminal on the side of the user.

20. The electronic leaflet system as set forth in claim 18, wherein said selection supporting unit further comprises:
a question unit for receiving, via the internet, various conditions presented by the authorized user by clicking an icon on the web site of said server side to designate each kind of the selection items related to the icon, and
an electronic leaflet presenting unit for searching said electronic leaflet data base based on the various conditions received from said question unit to select a predetermined number of electronic leaflets in descending order based on suitability for the various conditions input by the user and present the selected electronic leaflets to the client terminal on the side of the user.

21. The electronic leaflet system as set forth in claim 19, wherein said electronic leaflet browsing supporting unit comprises a movie reproduction unit for, when an electronic leaflet, in which at least one of moving picture data, voice data and document data are prepared as contents, is selected by the user, said electronic leaflet browsing unit automatically reproduces the at least one of moving picture data, voice data and document data on the display of the client terminal on the side of the user to promote understanding of the contents prepared in the selected electronic leaflet.

22. The electronic leaflet system as set forth in claim 21, wherein said at least one of moving picture data, voice data and document data comprise data generated by editing scenes of school lessons previously recorded or online classes and lecture meetings held by the educational organizations.

23. The electronic leaflet system as set forth in claim 21, wherein said at least one of moving picture data, voice data and document data comprise data generated by editing previously recorded interview scenes of lecturers in charge of attending-school or online classes and lecture meetings held by the educational organizations.

24. The electronic leaflet system as set forth in claim 21, wherein said at least one of moving picture data, voice data and document data comprise data generated by recording and editing interview scenes of students who previously attended school or online classes and lecture meetings held by the educational organizations.

25. The electronic leaflet system as set forth in claim 21, wherein said at least one of moving picture data, voice data and document data comprise data generated by editing teaching materials and transcripts of lectures for attending school or online classes previously presented by the educational organizations.

26. The electronic leaflet system as set forth in claim 19, wherein various kinds of selection items set in advance in said question unit comprise a condition related to at least one of ability and qualification required for attending school or online class chairs and lecture meetings held by the educational organizations, budget, class schedule and qualifying schedule.

27. The electronic leaflet system as set forth in claim 26, wherein
said question unit comprises:
a mock examination icon, which enables selection of a mock examination for supporting self-determination of at least one of basic scholastic ability and aptitude required for attending-school or online classes and lecture meetings held by the educational organizations,
a mock examination sending unit for, when the authorized user clicks the mock examination icon on the web site of said server side, sending through the internet question data of the mock examination to the client terminal on the side of the user, and
a mock examination determination unit receiving answer data from said client terminal of the user to mark the answer data, generating the various conditions comprising user's current ability, ability required for taking an online class or a lecture meeting, a kind of the online class or lecture meeting recommended and a specific name of the recommended online class or the recommended lecture meeting based on the marking result, and outputting the conditions to said electronic leaflet browsing supporting unit.

28. The electronic leaflet system as set forth in claim 16, further comprising a charging unit for charging an educational organization according to the volume of data at new registration or at updating of contents data of an electronic leaflet at said electronic leaflet generation unit.

29. The electronic leaflet system as set forth in claim 28, wherein said charging unit charges the educational organization according to the volume of data at the new registration or at the updating of contents data of the electronic leaflet, made in said electronic leaflet data base.

30. The electronic leaflet system as set forth in claim 28, wherein
when said client terminal on the user side accesses the website of said server user access rights are checked, if the user has chargeable right to access the electronic leaflets, said user access authentication unit informs said charging unit and said selection supporting unit that access of the user to at least one of chargeable moving picture data, chargeable voice data and chargeable document data is allowed,
said selection supporting unit receives, through said question unit, the various conditions presented by the user by clicking an icon on the web site of said server to designate each kind of the selection items related to the icon, and searches said electronic leaflet data base based on the various conditions received through said electronic leaflet presenting unit to select a chargeable electronic leaflet, from chargeable electronic leaflets accumulated in the electronic leaflet data base, that most closely matches the various conditions input by the user and present via the internet the selected electronic leaflet to said client terminal on the user side, and
said charging unit charges the user according to conditions of access to a chargeable electronic leaflet.

31. The electronic leaflet system as set forth in claim 28, wherein when at least one of chargeable moving picture data, chargeable voice data and chargeable document data are sent via the internet to said client terminal on the chargeable user side, the charging unit executes processing of charging the user for said at least one of chargeable moving picture data, chargeable voice data and chargeable document data.

32. The electronic leaflet system as set forth in claim 1, wherein the plurality of educational organizations comprise at least one of universities, preparatory schools, professional schools, cultural schools and private schools for elementary/junior high/high schools.

33. The electronic leaflet system as set forth in claim 1, wherein the charging unit charges the educational organization at updating of the contents data of the electronic leaflet previously generated by the electronic leaflet generation unit.

34. The electronic leaflet system as set forth in claim 1, wherein, when the charging unit charges the educational organization during the new registration, the charging unit charges the educational organization based on the volume of data in the electronic leaflet.

35. The electronic leaflet system as set forth in claim 1, wherein the menu options are generated based on the contents data.

* * * * *